United States Patent
Ubillos

(10) Patent No.: US 7,907,776 B2
(45) Date of Patent: Mar. 15, 2011

(54) COLOR LEVEL GRAPHICAL USER INTERFACE

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 12/205,836

(22) Filed: Sep. 5, 2008

(65) Prior Publication Data

US 2008/0316224 A1   Dec. 25, 2008

Related U.S. Application Data

(60) Division of application No. 10/371,359, filed on Feb. 19, 2003, now Pat. No. 7,447,351, which is a continuation of application No. 10/005,383, filed on Dec. 3, 2001, now Pat. No. 7,215,813.

(51) Int. Cl.
*G06K 9/00* (2006.01)
(52) U.S. Cl. .................. 382/167; 345/594
(58) Field of Classification Search .......... 382/100, 382/162, 167, 169, 274; 345/589, 590, 591, 345/594, 601, 605
See application file for complete search history.

(56) References Cited

U.S. PATENT DOCUMENTS

| | | | |
|---|---|---|---|
| 4,488,245 A | 12/1984 | Dalke et al. | |
| 5,313,275 A | 5/1994 | Daly et al. | |
| 5,363,477 A * | 11/1994 | Kuragano et al. | 345/426 |
| 5,416,890 A | 5/1995 | Beretta | |
| 5,469,188 A * | 11/1995 | Krishnamurthy et al. | 345/618 |
| 5,487,020 A * | 1/1996 | Long | 382/167 |
| 5,670,986 A * | 9/1997 | Leak | 345/604 |
| 5,774,112 A * | 6/1998 | Kasson | 345/601 |
| 5,850,471 A | 12/1998 | Brett | |
| 5,867,169 A | 2/1999 | Prater | |
| 5,930,009 A | 7/1999 | Sato et al. | |
| 5,982,924 A * | 11/1999 | Power et al. | 382/162 |
| 6,137,540 A | 10/2000 | Desprez-Le Goarant et al. | |
| 6,181,321 B1 | 1/2001 | Zhao et al. | |
| 6,236,750 B1 * | 5/2001 | Garber | 382/162 |
| 6,262,817 B1 * | 7/2001 | Sato et al. | 358/518 |
| 6,266,103 B1 * | 7/2001 | Barton et al. | 348/675 |

(Continued)

FOREIGN PATENT DOCUMENTS

EP    1454480    9/2004

(Continued)

OTHER PUBLICATIONS

Adobe photoshop 5.0 user manual 1998.*

(Continued)

*Primary Examiner* — Anand Bhatnagar
(74) *Attorney, Agent, or Firm* — Adeli & Tollen LLP

(57) ABSTRACT

A graphical user interface for performing color correction and methods for implementing the color correction are disclosed. The graphical user interface allows a user to adjust the colorspace of the pixels in the image. In one embodiment, a color adjustment pad allows the user to push the pixels from a particular luminance level a desired magnitude towards a desired hue. Pixels from other luminance levels are affected proportionally. The graphical user interface further allows a user to adjust the luminance of the pixels in the image. A luminance adjustment slider allows the user to adjust the luminance of pixels from a selected luminance level by a relative amount. Pixels from other luminance levels have their luminance are affected in a manner proportional to a difference between the selected luminance level value and the luminance value of the other pixel.

21 Claims, 22 Drawing Sheets

U.S. PATENT DOCUMENTS

| | | | |
|---|---|---|---|
| 6,268,939 B1 | 7/2001 | Klassen et al. | |
| 6,477,271 B1 | 11/2002 | Cooper et al. | |
| 6,751,347 B2 | 6/2004 | Pettigrew et al. | |
| 6,757,425 B2* | 6/2004 | Pettigrew et al. | 382/162 |
| 6,763,134 B2 | 7/2004 | Cooper et al. | |
| 6,765,608 B1* | 7/2004 | Himeda et al. | 348/211.5 |
| 6,822,640 B2* | 11/2004 | Derocher | 345/173 |
| 6,944,335 B2* | 9/2005 | Pettigrew et al. | 382/167 |
| 7,215,813 B2 | 5/2007 | Graves | |
| 7,447,351 B2 | 11/2008 | Ubillos | |
| 7,471,823 B2 | 12/2008 | Ubillos et al. | |
| 7,477,779 B2 | 1/2009 | Graves et al. | |
| 2001/0036310 A1 | 11/2001 | Pettigrew et al. | |
| 2001/0036356 A1* | 11/2001 | Weaver et al. | 386/52 |
| 2002/0021221 A1* | 2/2002 | Okamoto et al. | 340/577 |
| 2003/0016866 A1* | 1/2003 | Cooper et al. | 382/167 |
| 2003/0016881 A1* | 1/2003 | Matsuura | 382/274 |
| 2003/0025835 A1 | 2/2003 | Segman | |
| 2003/0026609 A1* | 2/2003 | Parulski | 396/281 |
| 2003/0103057 A1 | 6/2003 | Graves | |
| 2003/0128220 A1 | 7/2003 | Ubillos | |
| 2003/0133609 A1 | 7/2003 | Ubillos et al. | |
| 2007/0248264 A1 | 10/2007 | Graves et al. | |
| 2009/0073184 A1 | 3/2009 | Ubillos et al. | |

FOREIGN PATENT DOCUMENTS

| | | |
|---|---|---|
| WO | WO 03/069894 | 8/2003 |

OTHER PUBLICATIONS

Adobe photoshop 5.0 user manual, pp. 50,51,and 105-135, 1998.*
U.S. Appl. No. 12/326,869, filed Dec. 2, 2008, Ubillos, Randy, et al.
Updated portions of prosecution history of U.S. Appl. No. 10/005,383, filed Sep. 14, 2006, Graves, Eric, et al.
Updated portions of prosecution history of U.S. Appl. No. 11/694,922, filed Jul. 31, 2008, Graves, Eric, et al.
Updated portions of prosecution history of U.S. Appl. No. 10/371,006, filed Oct. 20, 2008, Ubillos, Randy, et al.
Portions of prosecution history of U.S. Appl. No. 12/326,869, filed Nov. 23, 2009, Ubillos, Randy, et al.
Updated portions of prosecution history of U.S. Appl. No. 10/371,359, filed Sep. 15, 2008, Ubillos, Randy.
Non-Final Office Action of U.S. Appl. No. 10/005,383, mailing date May 5, 2004, Graves, Eric, et al., now issued U.S. Patent 7,215,813.
Restriction Requirement of U.S. Appl. No. 10/005,383, mailing date Jan. 26, 2005, Graves, Eric, et al., now issued U.S. Patent 7,215,813.
Final Office Action of U.S. Appl. No. 10/005,383, mailing date Aug. 10, 2005, Graves, Eric, et al., now issued U.S. Patent 7,215,813.
Final Office Action of U.S. Appl. No. 10/005,383, mailing date Jan. 9, 2006, Graves, Eric, et al., now issued U.S. Patent 7,215,813.
Non-Final Office Action of U.S. Appl. No. 10/005,383, mailing date Jun. 14, 2006, Graves, Eric, et al., now issued U.S. Patent 7,215,813.
Notice of Allowance of U.S. Appl. No. 10/005,383, mailing date Dec. 13, 2006, Graves, Eric, et al., now issued U.S. Patent 7,215,813.
Non-Final Office Action of U.S. Appl. No. 10/371,006, mailing date Oct. 15, 2004, Ubillos, Randy, et al., now U.S. Published 2003/0133609.
Final Office Action of U.S. Appl. No. 10/371,006, mailing date Aug. 9, 2005, Ubillos, Randy, et al., now U.S. Published 2003/0133609.
Non-Final Office Action of U.S. Appl. No. 10/371,006, mailing date Apr. 6, 2006, Ubillos, Randy, et al., now U.S. Published 2003/0133609.
Final Office Action of U.S. Appl. No. 10/371,006, mailing date Sep. 22, 2006, Ubillos, Randy, et al., now U.S. Pulished 2003/0133609.
Non-Final Office Action of U.S. Appl. No. 10/371,006, mailing date Apr. 4, 2007, Ubillos, Randy, et al., now U.S. Published 2003/0133609.
Final Office Action of U.S. Appl. No. 10/371,006, mailing date Oct. 18, 2007, Ubillos, Randy, et al., now U.S. Published 2003/0133609.
Restriction Requirement of U.S. Appl. No. 10/371,006, mailing date May 15, 2008, Ubillos, Randy, et al., now U.S. Published 2003/0133609.
Non-Final Office Action of U.S. Appl. No. 10/371,359, mailing date Oct. 6, 2004, Ubillos, Randy., now U.S. Published 2003/0128220.
Non-Final Office Action of U.S. Appl. No. 10/371,359, mailing date Oct. 6, 2005, Ubillos, Randy., now U.S. Published 2003/0128220.
Non-Final Office Action of U.S. Appl. No. 10/371,359, mailing date Apr. 5, 2006, Ubillos, Randy., now U.S. Published 2003/0128220.
Final Office Action of U.S. Appl. No. 10/371,359, mailing date Nov. 3, 2006, Ubillos, Randy., now U.S. Published 2003/0128220.
Non-Final Office Action of U.S. Appl. No. 10/371,359, mailing date Jul. 2, 2007, Ubillos, Randy., now U.S. Published 2003/0128220.
Restricition Requirement of U.S. Appl. No. 10/371,359, mailing date Apr. 30, 2008, Ubillos, Randy., now U.S. Published 2003/0128220.
Notice of Allowance of U.S. Appl. No. 10/371,359, mailing date Aug. 8, 2008, Ubillos, Randy., now U.S. Published 2003/0128220.
International Search Report for PCT/US2002/038712, mailing date Sep. 24, 2003, Apple Computer, Inc., now issued U.S. appl. No. 7,215,813.
PCT Written Opinion for PCT/US2002/038712, mailing date May 20, 2004, Apple Computer, Inc.
International Preliminary Examination Report for PCT/US2002/038712, mailing date Sep. 8, 2004, Apple Computer, Inc.
"Color Finesse" 2001, Synthetic Aperture XP002253846 pp. 1-2 & "New Stuff" 'Online! Retrieved from the Internet: <URL: www.synthetic-ap.com/newstuff/index.html> retrieved on Sep. 8, 2003! Color Finesse was previewed on Aug. 27, 2001.
Adobe Photoshop 5.0 User Guide 1998: Chapter 3: "Getting Images into Photoshop" pp. 50-51, Chapter 6: "Making Color and Tonal Adjustments" pp. 105-133, pp. 226-227, p. 299, p. 231, Chapter 10: "Using Channels and Masks" pp. 239-255.
Notice of Allowance of U.S. Appl. No. 11/694,922, mailing date Sep. 30, 2008, Graves, Eric, et al.
Notice of Allowance of U.S. Appl. No. 10/371,006, mailing date Sep. 16, 2008, Ubillos, Randy, et al.
Non-Final Office Action of U.S. Appl. No. 12/326,869, mailing date Mar. 4, 2010, Ubillos, Randy, et al.
European Patent Office Action of 02806816, mailing date Apr. 7, 2010, Apple Computer, Inc.
Author Unknown, "Adobe Photoshop 5.0 Limited Edition, Chapter 4: Making Color and Tonal Adjustments", Adobe Photoshop 5.0 User Guide, Jan. 1, 1998, pp. 67-89.
Examiner Interview Summary Record of U.S. Appl. No. 10/371,006, mailing date Sep. 2, 2008, Ubillos, Randy, et al.

* cited by examiner

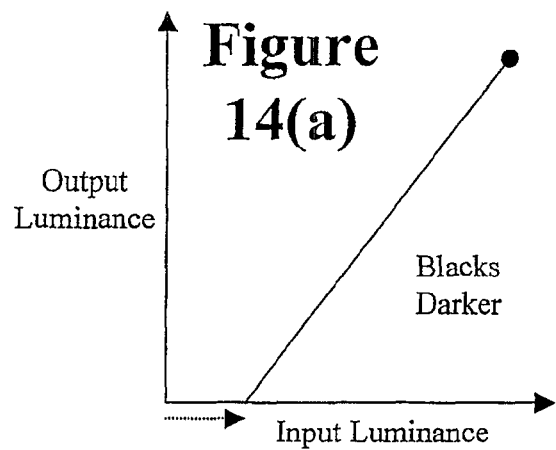
Figure 14(a) — Blacks Darker
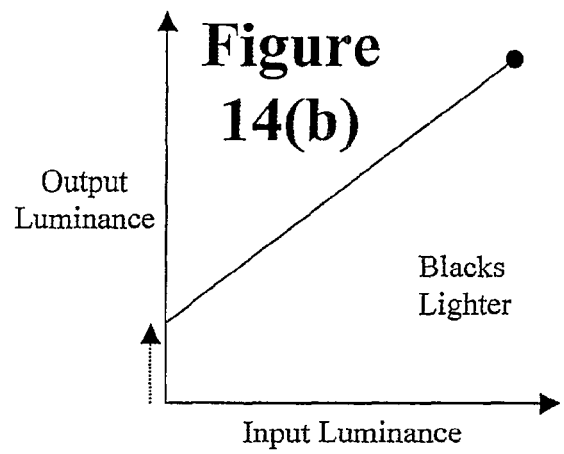
Figure 14(b) — Blacks Lighter
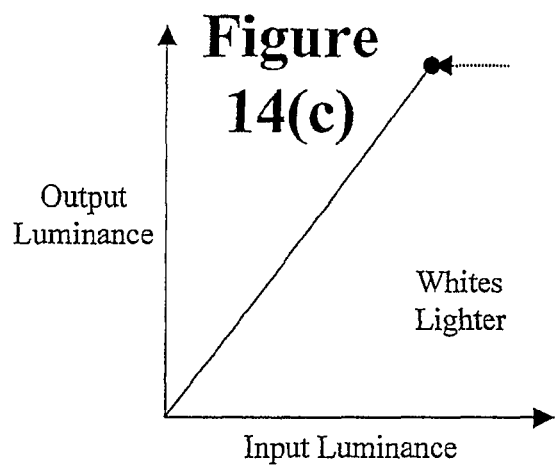
Figure 14(c) — Whites Lighter
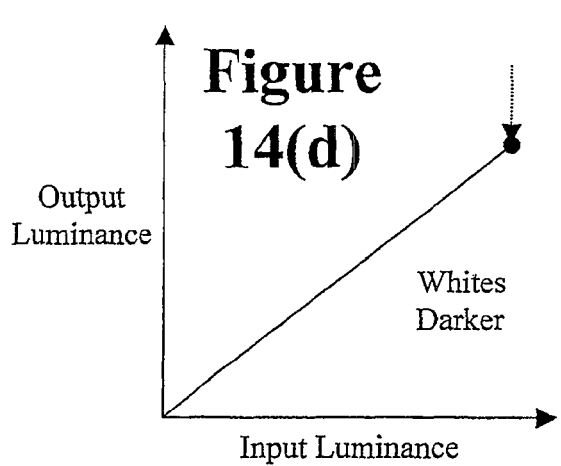
Figure 14(d) — Whites Darker
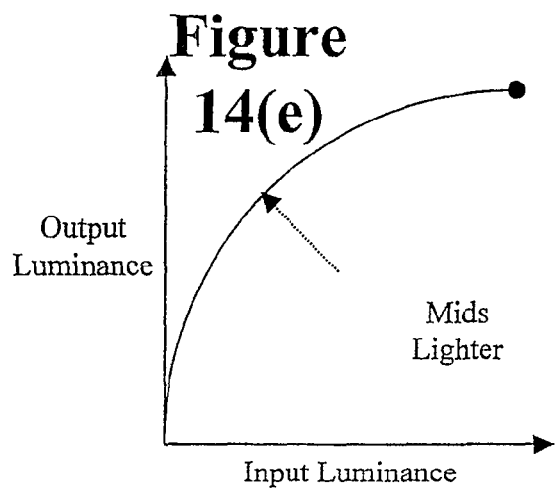
Figure 14(e) — Mids Lighter
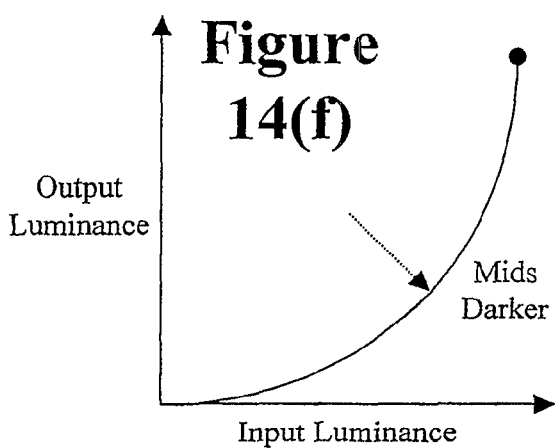
Figure 14(f) — Mids Darker

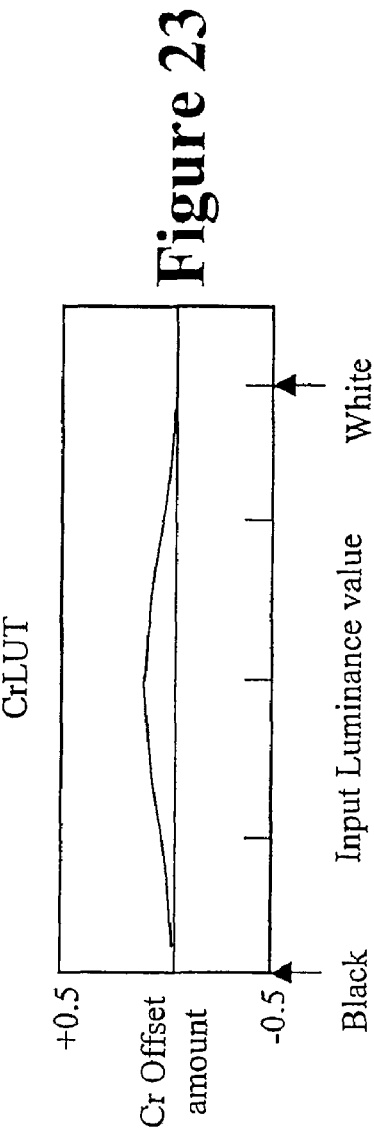
Figure 22
Figure 23
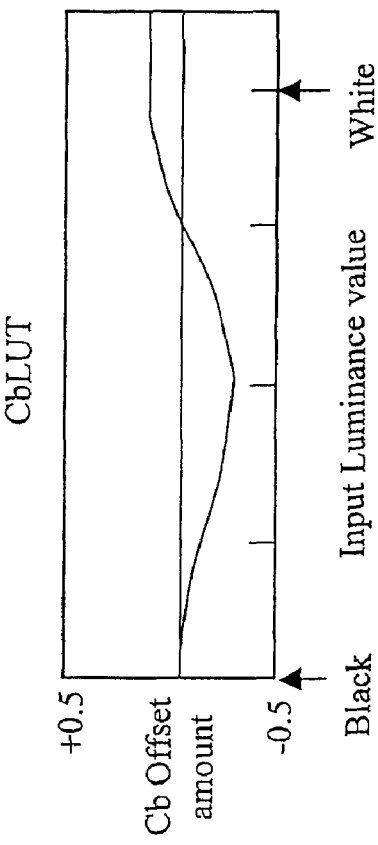
Figure 21

COLOR LEVEL GRAPHICAL USER INTERFACE

CLAIM OF BENEFIT TO PRIOR APPLICATIONS

This application is a divisional application of U.S. patent application Ser. No. 10/371,359, filed Feb. 19, 2003, which has now issued as U.S. Pat. No. 7,447,351. U.S. patent application Ser. No. 10/371,359 is a continuation application of U.S. patent application Ser. No. 10/005,383, filed Dec. 3, 2001, which has now issued as U.S. Pat. No. 7,215,813. U.S. patent application Ser. No. 10/371,359 is herein incorporated by reference.

FIELD OF THE INVENTION

The present invention relates to the field of digital image processing. In particular the present invention discloses a graphical user interface and methods for performing color correction and color keying.

BACKGROUND OF THE INVENTION

Recent advances in video processing technologies have led to a surge in popularity of new video processing applications that make powerful video editing capabilities available to a wide base of users. Typically, video processing applications allow users to download and upload video and audio segments, as well as edit and manipulate these segments for producing a cohesive video or movie.

In performing such tasks, video processing applications often use a video capture card to capture and store video segments onto the hard drive of a computer system. Video capture cards typically employ a coder/decoder (also called a "CODEC") to compress the video with a compression standard such as Motion-JPEG, DV, MPEG-1, MPEG-2, etc. Many digital video storage formats store pixel data in a luminance and chrominance colorspace often referred to Y/Cr/Cb (also referred to as YUV). In a luminance and chrominance colorspace three components are stored for each pixel: one for luminance (Y) and two for color information (Cr and Cb). Most computer display systems store pixel information in an RGB format that also contains three components per pixel, one each for the Red (R), Green (G), and Blue (B) portions of the color. Pixel information stored in either YUV or RGB format can be converted to the other format using straightforward matrix mathematics.

In the DV (digital video) storage format, storage is typically accomplished with an 8-bit luminance (Y) value for each pixel. Eight bits allow luminance (Y) values ranging from 0 through 255. In 8-bit digital video, black is typically encoded at Y=16 and white is encoded at Y=235. The luminance values from 1 to 15, referred to as footroom, and 236 to 254, referred to as headroom, are used to accommodate ringing and overshoot in a signal. Industry standard equations (such as those specified by Rec. ITU R BT-601) can convert 8-bit RGB encoded images with RGB values ranging from 0 to 255 into YUV encoded images with luminance (Y) values ranging from 16 to 235. Most software DV CODECs follow this mapping so that a user may translate, say, naturalistic computer pictures into quality video.

However, there are several phenomena which may contribute to degradation or compromising of the dynamic range of given colors in a resulting video segment. For example, difficulties often arise, for example, because cameras can often capture values that are superwhite (values resulting from specular reflections, sun, or bright lights, clouds or white walls). Superwhite values may exceed the nominal white value of 235 as registered on a waveform monitor, where these whites may peak at 100 IRE (NTSC) which is the brightest value allowable on a broadcast RF modulator. In the YUV space, the Y values range from 235 to 254; but on a waveform monitor, whites can be seen to range from 100 IRE to almost 110 IRE, all of which represent illegal values (e.g., Y values above 254), and are accordingly clipped to 254 by a CODEC when converting to RGB, thereby compromising the dynamic range of at least the white value in a given digital image.

Typically, users may attempt to mitigate such value degradation by employing color correction of the RGB space. A problem arises, however, because color correction still yields only a limited amount of headroom for colors (such as superwhite), and also requires extensive operation cycles, execution time, and memory access in computer systems that support digital video processing applications. Inherent in such a problem is the need for rendering, where editing is translated and stored on the hard drive of a computer system supporting a given video image processing application. Even recently developed "real time" systems still need to go back to rendering in cases where a user simultaneously color corrects, adds filters, effects, and superimposes graphics, even for a high end real time system, the capacity will be overwhelmed and the real time performance will be compromised. As such, there are still deficiencies not addressed by recent advances in video processing, which in particular concerns the limited overhead on color values and a less expensive approach to color correction.

SUMMARY OF THE INVENTION

A graphical user interface for performing color correction and methods for implementing the color correction are disclosed. The graphical user interface allows a user to adjust the colorspace of the pixels in the image. In one embodiment, a color adjustment pad allows the user to push the pixels from a particular luminance level a desired magnitude towards a desired hue. Pixels from other luminance levels are affected proportionally. The graphical user interface further allows a user to adjust the luminance of the pixels in the image. A luminance adjustment slider allows the user to adjust the luminance of pixels from a selected luminance level by a relative amount. Pixels from other luminance levels have their luminance are affected in a manner proportional to a difference between the selected luminance level value and the luminance value of the other pixel.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIGS. 14(a) to 14(g) illustrates graphical representations of the various input versus output relationships within a lookup table for luminance correction within the inventive system, as well as the control points of the Bezier curve which describes the M control modifications within the look-up table.

FIG. 21 illustrates another example of a modified cylindrical colorspace representation where Cb and Cr have been pushed at M and W, but B remains the same.

FIG. 22 illustrates the look up table that provides an offset amount for a given luminance input, as a result of the application of the gMidRamp function to the Cb example taken from the specific example in FIG. 21.

FIG. 23 illustrates the look up table that provides an offset amount for a given luminance input, as a result of the application of the gMidRamp function to the Cr example taken from the specific example in FIG. 21.

DETAILED DESCRIPTION OF THE PREFERRED EMBODIMENT

A method and user interface for performing color correction is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Bezier curves. However, the same techniques can easily be applied with other types of curved functions.

Digital Video and Colorspaces

Digital video pixel information is commonly stored in a three component luminance and chrominance format. For example, both the MPEG-1 and MPEG-2 digital video standards encode pixel data with three component luminance and chrominance format.

The luminance specifies the brightness of a pixel. Luminance ranges from pure black to pure white. Luminance is typically expressed in a single component Y value. The chrominance specifies the color of a pixel and is stored as two component values Cr and Cb (that are also referred to as U and V values). One reason that digital video is stored in a luminance and chrominance format is that human vision is much more sensitive to luminance information than chrominance information such that separate chrominance information can be more heavily compressed without significantly detectable image degradation.

Computer display systems generally represent pixel information in a three component RGB format wherein the three components specify the amount of Red (R), Green (G), and Blue (B) required to represent a pixel. Pixel information stored in either RGB format or YUV format can easily be converted to the other format using simple matrix math.

Figure 1B:
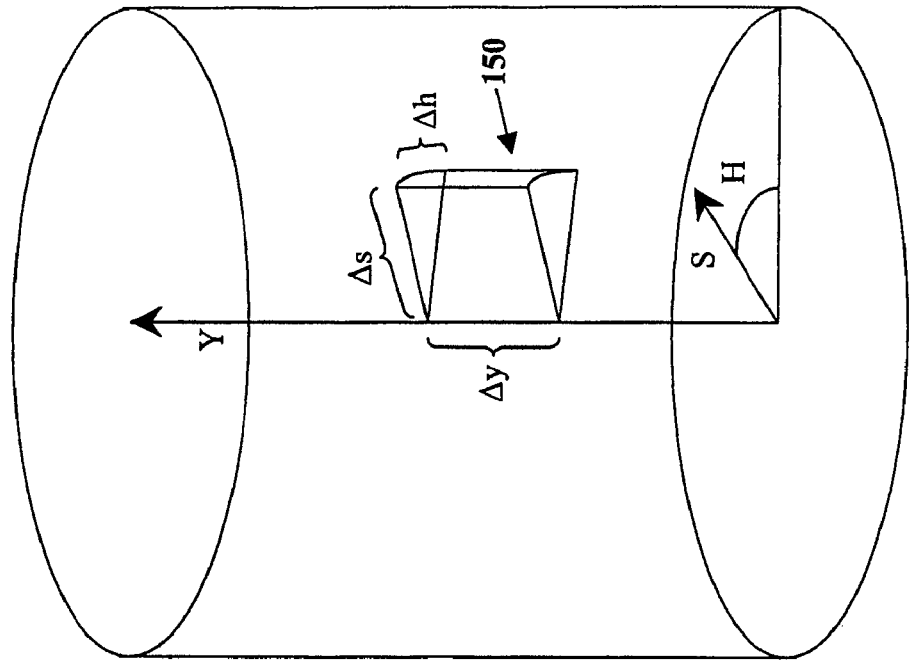
FIG. 1(b) illustrates a conceptual diagram of a three-dimensional colorspace of FIG. 1(a) defined in an alternate hue (H), saturation (S), and luminance (Y) format.
Figure 1A:
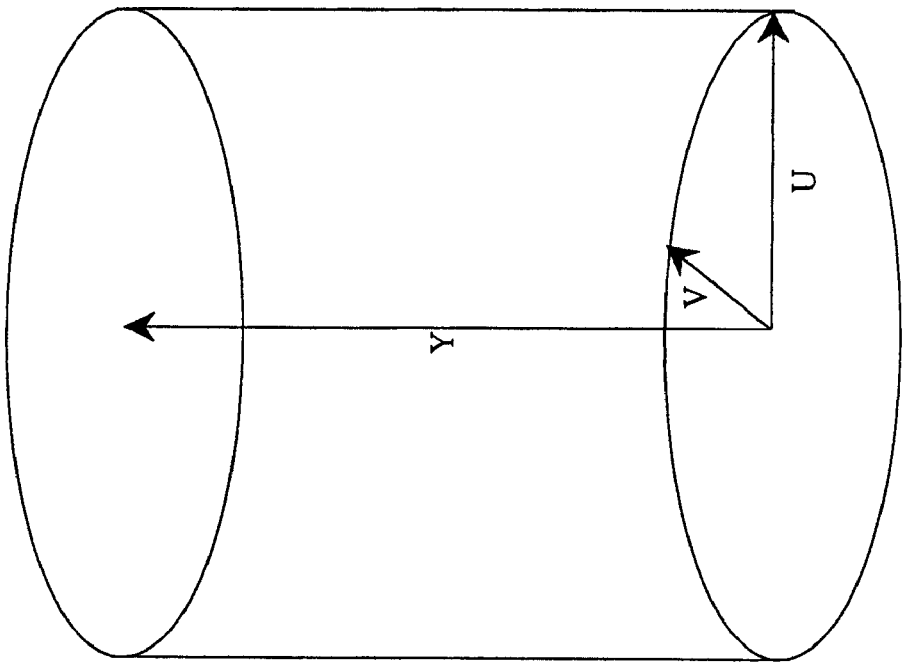
FIG. 1(a) illustrates a conceptual diagram of a three-dimensional colorspace defined in the luminance (Y) and chrominance (UV) format known as a YUV format.

FIG. 1(a) illustrates a conceptual diagram of a three-dimensional colorspace defined in the luminance (Y) and chrominance (UV) YUV format. The two part UV chrominance value is not intuitive to humans. Thus, the colorspace often defined in an alternative hue (H), saturation (S), and luminance (Y) format.

FIG. 1(b) illustrates an alternate interpretation of the three-dimensional colorspace in FIG. 1(a). The colorspace of FIG. 1(b) is defined in terms of luminance (Y), hue (H), and saturation (S).

The luminance (Y) value continues to represent the brightness of a pixel. Luminance (Y) is represented as a vertical coordinate along the vertical axis of the cylinder of the cylindrical colorspace of FIG. 1(b).

The hue (H) represents a particular color value. Hue is represented as an angle from the center of the cylinder of the cylindrical colorspace of FIG. 1(b). Hue is often specified on a common color wheel.

Saturation (S) refers to the depth or intensity of a pixel's color (hue). In other words, how strong the color is relative to an unsaturated white/gray/black of the same luminance level. For example, a deep red has a high level of saturation (mostly pure red with little white) and a pinkish red is only lightly saturated (less pure red and a higher level of white). Saturation is represented in the colorspace of FIG. 1(b) as a distance along a vector defined by the hue (H) angle.

Color Correction

Film and television feature productions generally go through three phases: pre-production, production, and post-production. The pre-production phase is when the script is created, the actors are cast, and the sets are built. During production phase, the actual film is shot or the videotape is recorded using the actors and sets. Finally, during the post-production, the film or video tapes is edited together, the sound is edited, music is added, special effects are added, and the film or video tape images are adjusted.

As part of the post-production process, the images from many films and television shows go through a process of "color correction." The process of color correction is used to fix color problems that occur during the filming or videotape production.

Professional colorists refer to primary, secondary, and tertiary color correction. Primary color correction involves fixing the basic color balance of an image to make it look correct with true color representation. Primary color correction problems include incorrect color casting from bad lighting, color problems caused by color filters, and improper exposure. Secondary color correction problems are caused by mismatched colors from related scenes shot at different times or with different lighting.

Tertiary color correction is actually color enhancement such as making a scene darker to enhance a particular mood. Tertiary color correction is also used to perform certain special effects. For example, the director or editor may wish to change the color of specific objects in a scene. For example, the director or editor may change the color of clothing worn by a particular character. The director may change the eye color of characters such as the distinctive blue eyes in the feature film "Dune."

A Color Correction System

The present invention introduces a new color correction system that allows post-production specialists to have a wide latitude of control over the colors in series of images. The color correction system uses a highly intuitive graphical user interface such that post-production specialists can quickly learn the color correction system and professionally apply its features.

Figure 2:
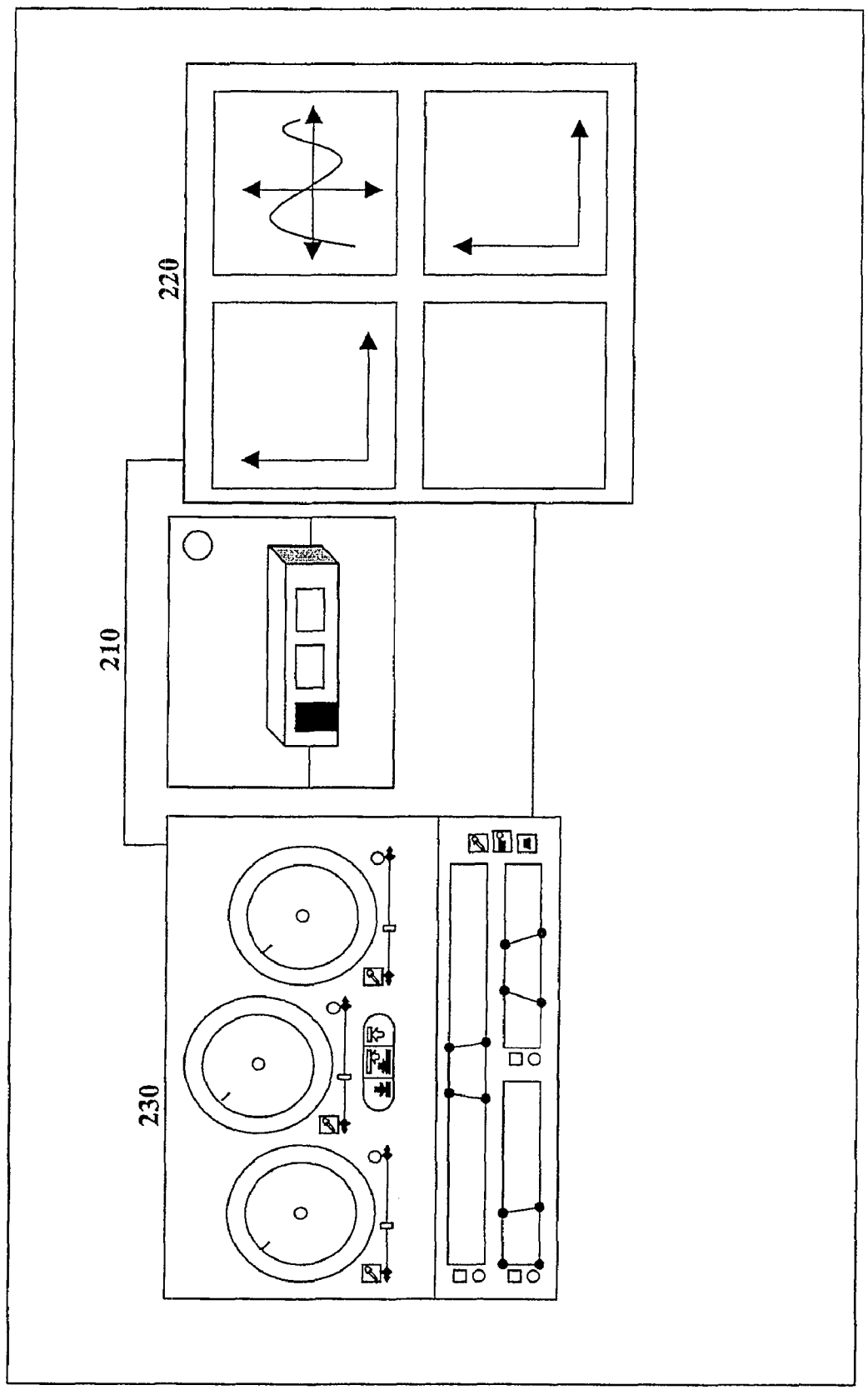
FIG. 2 illustrates one embodiment of a graphical user interface for a color correction control system of the present invention.

FIG. 2 illustrates one embodiment of a graphical user interface for a color correction control system of the present invention. In the graphical user interface of FIG. 2, there are three different windows for presenting information.

Image Canvas Window

A first window 210 is a "canvas" window that displays the video or other images that are being adjusted with the color correction system. In a preferred embodiment, the canvas window 210 includes novel feedback systems that provide more information than just the image.

Images may contain pixels that exceed a maximum luminance value allowed for broadcast material. Thus, it would be desirable to be able to identify and locate pixels that exceed this maximum allowed luminance value. In one embodiment, the canvas window 210 can be placed into a luminance test mode. When in the luminance test mode, the color correction system tests the all the pixels in an image to determine if the luminance of each pixel is close to or above an acceptable luminance threshold value. An example of the luminance test mode will be described with reference to FIGS. 3(a) to 3(c).

Figure 3B:
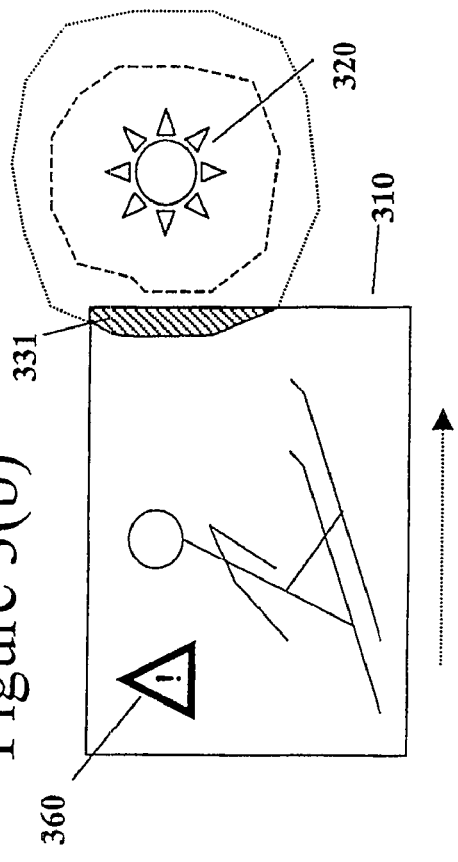
FIG. 3(b) illustrates a subsequent video frame in the canvas window with all the pixels close to an allowable maximum highlighted with zebra striping.
Figure 3A:
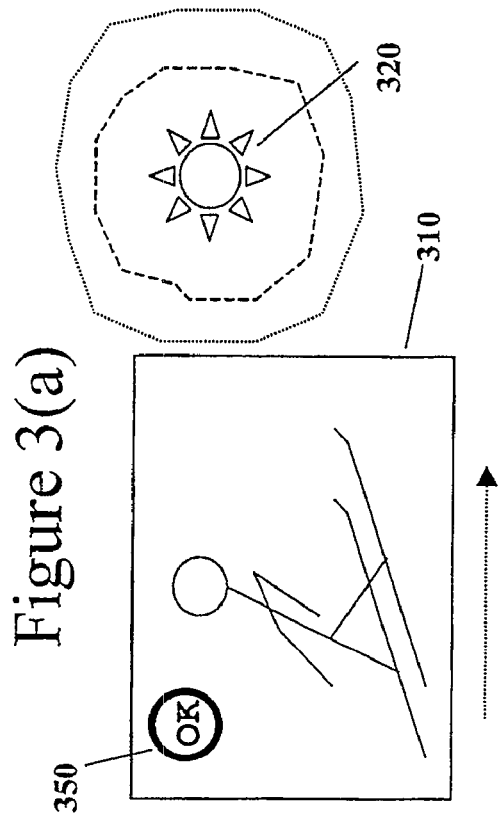
FIG. 3(a) illustrates a compliant video frame in the canvas window.

FIG. 3(a) illustrates a canvas window video frame 310 that is tracking a ski jumper that will soon pass by the sun 320 that is currently not in the video frame. The sun emits so much light that it can easily cause image pixels having luminance values that are out of range. Referring to FIG. 3(a), since the skier is not yet close enough to the sun, all the pixels are currently within the luminance threshold. Thus, when all the pixels are within the maximum luminance value, the canvas window video frame 310 may simply display an indication such as the "OK" indication 350 that indicates that the image is compliant with the luminance restrictions.

Referring to FIG. 3(b), as the skier comes closer to the sun, some of the pixels in a halo around the sun come very close to the maximum luminance value allowed for broadcast material. In one embodiment, "very close" is defined as within 10% maximum luminance value allowed for broadcast material. To warn the user about this, the luminance test mode displays a warning indication 360 in the canvas window video frame 310. Furthermore, the luminance test mode highlights the pixels 331 very close to the maximum luminance value. In one embodiment, the pixels are "zebra striped" with green stripes. Note that the zebra striping allows the underlying image to remain visible.

Figure 3C:
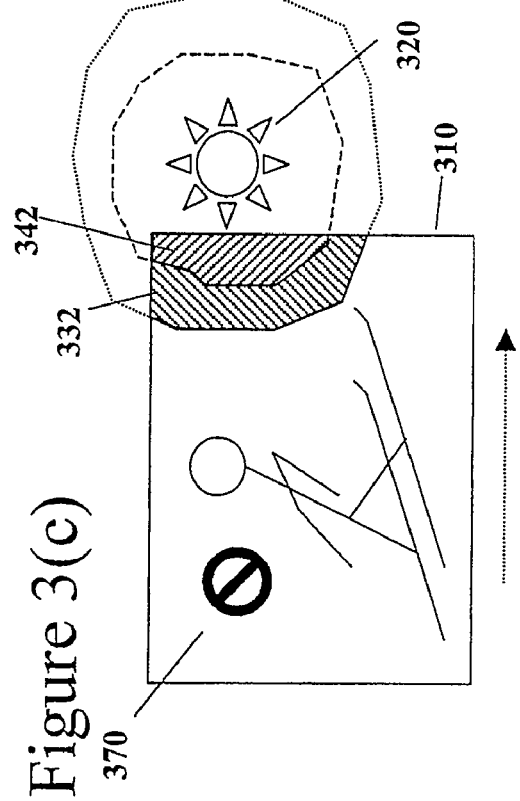
FIG. 3(c) illustrates a subsequent video frame in the canvas window with all the pixels close to an allowable maximum highlighted with a first zebra striping and all the pixels exceeding the allowable maximum highlighted with a second zebra striping.

Finally, referring to FIG. 3(c), the skier is close to the sun such that some of the pixels from a halo around the sun come exceed the maximum luminance value allowed for broadcast material. To alert the user about the "illegal" pixels, the luminance test mode displays a violation indication 370 in the canvas window video frame 310. Furthermore, the luminance test mode highlights the pixels 332 very close to the maximum luminance value and the noncompliant pixels 342 that exceed the maximum luminance value. In one embodiment, the pixels close to the maximum luminance value are zebra striped with green stripes and the pixels exceeding the maximum luminance value are zebra striped with red stripes.

In alternate embodiments, the luminance test mode may display pixels "close" (within 20%) with green zebra striping, "very close" (within 10%) with yellow zebra striping, and exceeding the maximum luminance value with red zebra striping. Furthermore, in one embodiment the canvas window video frame implements a saturation test mode. When in the saturation test mode, the pixels that exceed the maximum allowed color saturation are highlighted with zebra striping. In a preferred embodiment, the user may activate the luminance test mode and the saturation test mode simultaneously such that the user can locate over saturated pixels and pixels that exceed the maximum allowed luminance value at the same time.

Workbench Scopes Window

A second window 220 is a "workbench" window that displays a number of commonly used scopes for video editing. The workbench window 220 may include scopes such as a waveform monitor, a vectorscope, and a luminosity histogram as is well known in the art. Other useful graphs may be created or subsequently added at a later date. The combination of the canvas window 210 and the workbench window 220 provide feedback to the user.

Color Correction Tools Window

The third window 230 is a color correction interface window that contains tools for performing color correction. The color correction interface window 230 comprises a graphical user interface containing several different color correction tools for performing color correction on the images in the canvas window 210. The graphical user interface containing several different color correction tools for performing color correction and the methods that implement those color correction tools are one of the primary focuses of this document.

A Color Correction Graphical User Interface

Figure 4:
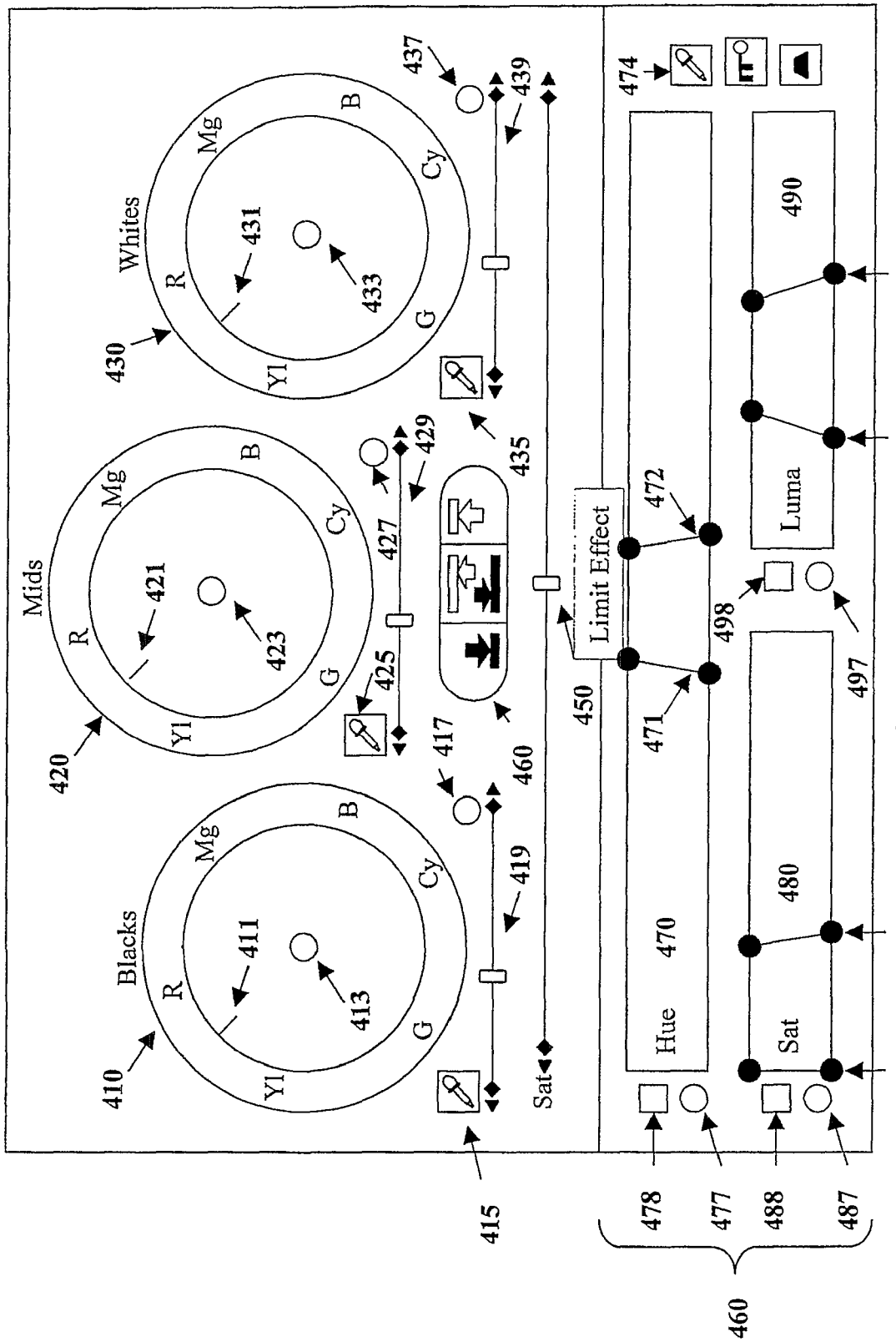
FIG. 4 illustrates one embodiment of a graphical user interface for the color correction window 230 of the color correction control system in FIG. 2.

FIG. 4 illustrates one embodiment of a graphical user interface for the color correction window 230 of the present invention. Other embodiments will be described but practicing the invention does not require implementing all the features of one particular embodiment.

Color Plane Adjustment Pads

In the color correction window 230 embodiment of FIG. 4, there are three different color adjustment pads 430, 420, and 410. Each color adjustment pad displays the spectrum of hues around the perimeter. The primary and secondary colors of the spectrum are labeled on the color adjustment pad spectrum as Red (R), Magenta (Mg), Blue (B), Cyan (Cy), Green (G), and Yellow (Yl). Different saturation levels are displayed for each hue with zero saturation (white) in the center. A hatch mark 431, 421, and 411 specifies the normal flesh tone hue for the different color adjustment pads 430, 420, and 410, respectively.

The color adjustment pads 430, 420, and 410 allow the user to adjust the meaning of "white", "gray", and "black" respectively by shifting the center toward a particular hue. Specifically, a user may use a cursor control device to draw a vector from the center 431, 421, and 411 of a color adjustment pad toward a particular hue (angle) for a specified distance (magnitude). The color correction then adjusts all the colors accordingly. In a preferred embodiment, the controls produce relative adjustments.

Figure 5:
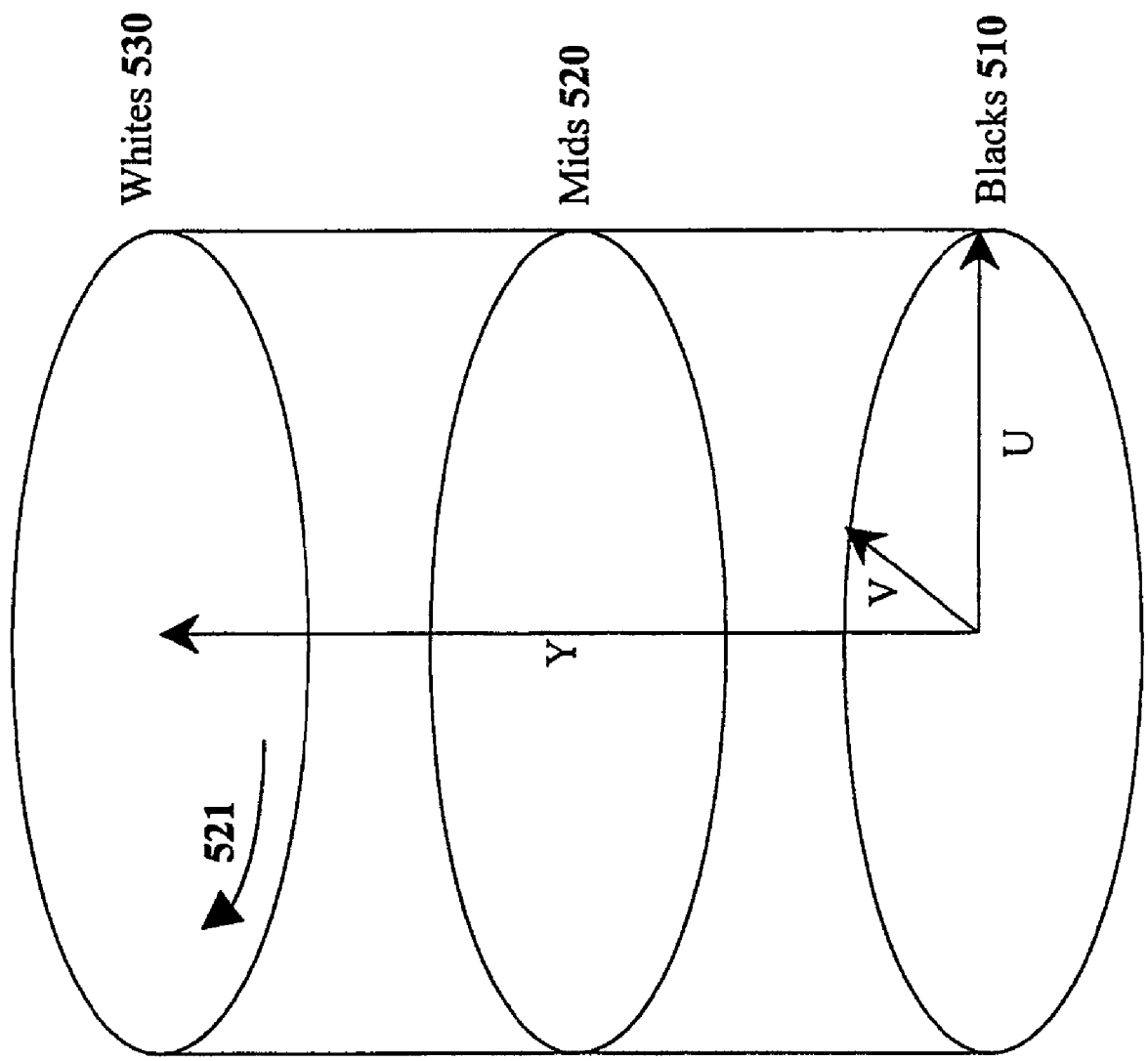
FIG. 5 illustrates a white luminance plane, a mids luminance plane, and a blacks luminance plane in the colorspace of FIGS. 1(a) and 1(b).

The three different color adjustment pads 410, 420, and 430 correspond to constant luminance planes in the three-dimensional colorspace illustrated in FIG. 5. Specifically, whites color adjustment pad 430 corresponds to whites luminance plane 530, mids (middle) color adjustment pad 420 corresponds to a mids (middle) luminance plane 520, and blacks color adjustment pad 410 corresponds to blacks luminance plane 510. The three different color adjustment pads 430, 420, and 410 allow a user to adjust the colors of pixels having the luminance level of the corresponding luminance plane 530, 520, and 510, respectively.

Each color adjustment pad 410, 420, and 430 includes an associated reset button 417, 427, and 437, respectively. The reset button resets the color balance to the default (no adjustment) state.

Each color adjustment pad 410, 420, and 430 also includes an eyedropper button 415, 425, and 435, respectively. The eyedropper button allows the user to select a color from the image and define that selected color as the center (unsaturated) value of the associated luminance plane. In this manner, a user may perform post-production white balancing by selecting a colored pixel from an object known to be white in an image.

When an adjustment is made for a particular luminance level, other luminance levels are affected as well. When the whites color adjustment pad 430 or the blacks color adjustment pad 410 is used to adjust the whites luminance plane 530 or blacks luminance plane 510, respectively, all the other luminance places are adjusted proportionally according to their distances from the adjusted luminance plane. In one embodiment, an adjustment to the whites luminance plane 530 or blacks luminance plane 510 causes the other luminance planes to be adjusted depending on how close those planes are to the adjusted luminance plane. When the mids color adjustment pad 420 is used to adjust the mids luminance plane 520, then the other luminance places are also adjusted. However, in one embodiment, an adjustment to the mids luminance plane 520 causes the other luminance planes to be adjusted according to a curve depending on how close those planes are to the adjusted mids luminance plane 520.

Color Plane Adjustment Examples

Figure 6A:
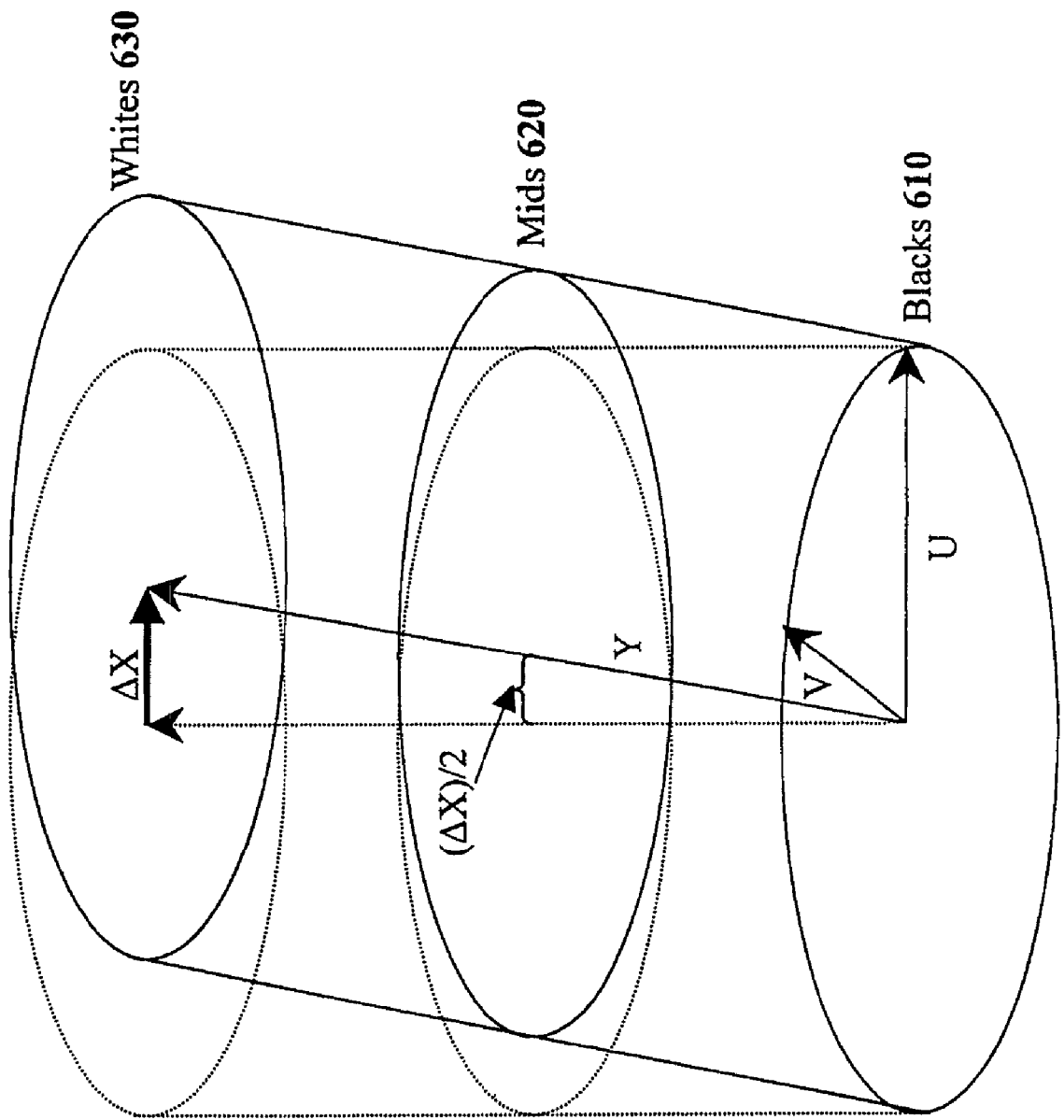
FIG. 6(a) illustrates the effect of moving the white luminance plane of the cylindrical colorspace representation to the right.

Referring to FIG. 4, if the user moves the center of the whites color adjustment pad 430 to the right, the pixels of the high luminance level plane 530 are adjusted toward the blue (B) hue and lower luminance level planes are adjusted proportionally. Specifically, FIG. 6(a) illustrates how the three-dimensional colorspace is adjusted when the user moves the center of the whites color adjustment pad 430 to the right by an amount of $\Delta X$. Note that the mids luminance plane 620 is moved over half as much (($\Delta X$)/2) as the whites luminance level plane 630 and that the blacks luminance level plane 610 is not adjusted at all. Note that the luminance axis Y now extends upward at an angle into the colorspace.

Figure 6B:
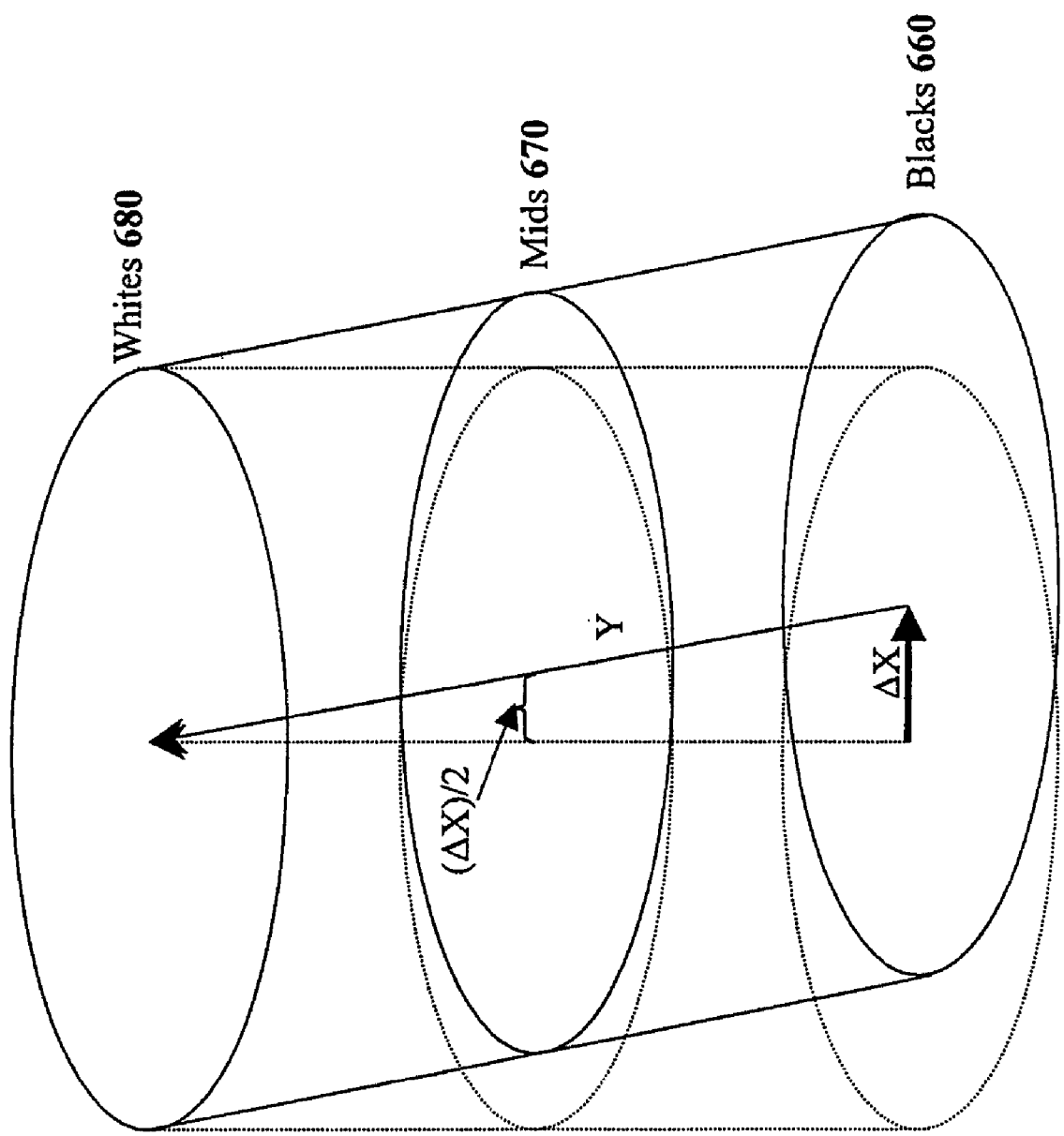
FIG. 6(b) illustrates the effect of moving the black luminance plane of the cylindrical colorspace representation to the right.

Similarly, if the user moves the center of the blacks color adjustment pad 410 to the right, the pixels of the blacks luminance level plane are adjusted toward the blue (B) hue and higher luminance level planes are adjusted proportionally. Specifically, FIG. 6(b) illustrates how the three-dimensional colorspace is adjusted when the user moves the center of the blacks color adjustment pad 410 to the right by an about $\Delta X$. Again, the mids luminance plane 670 is moved over half as much (($\Delta X$)/2) as the blacks luminance plane 660 and the whites luminance level plane 680 remains stationary.

Figure 7:
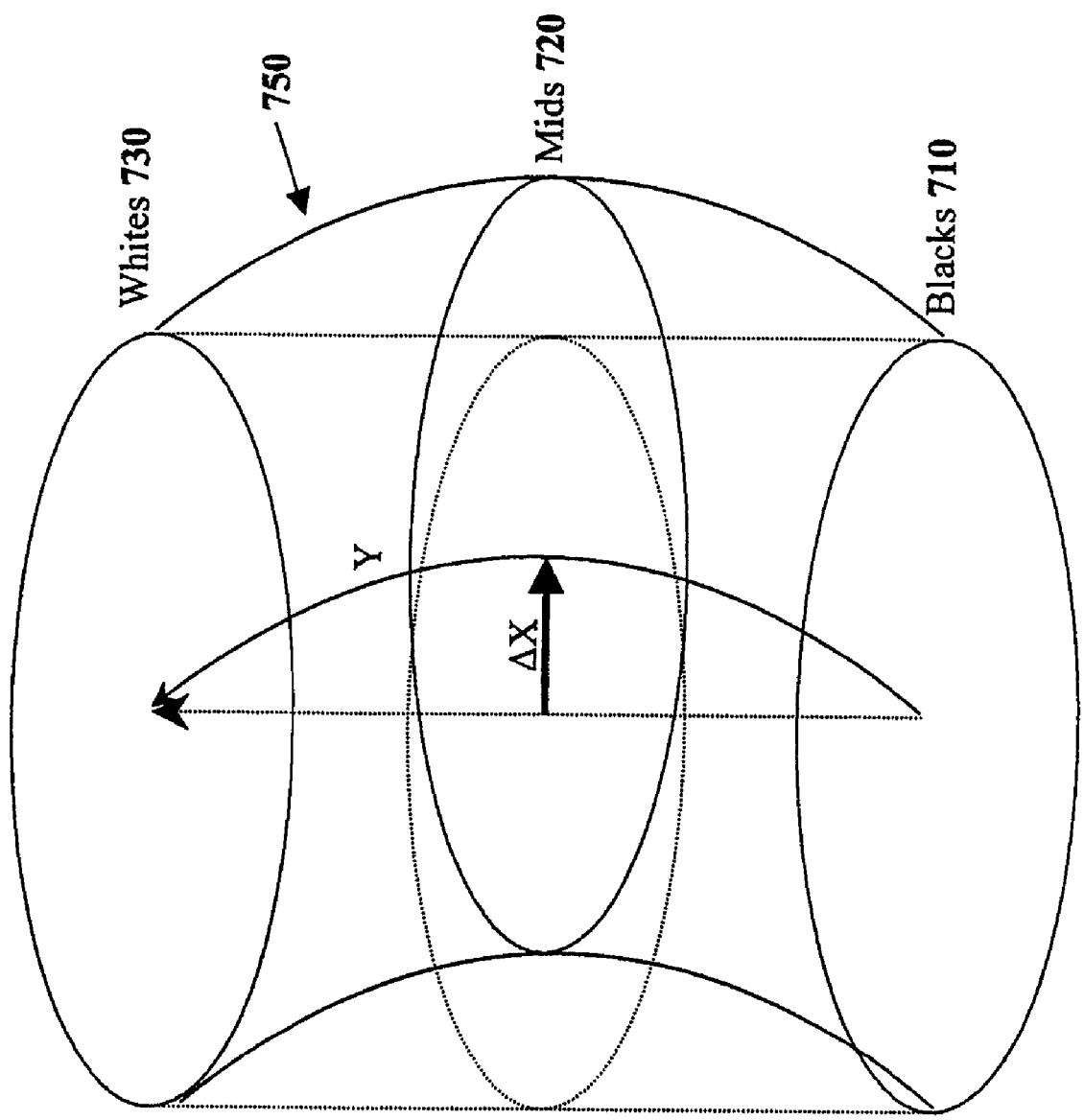
FIG. 7 illustrates the effect of moving the mids luminance plane on the cylindrical colorspace representation to the right.

If the user moves the mids (middle) color adjustment pad 420, the system moves colors of the mids luminance plane 520 accordingly. The other luminance planes are also moved, but by an amount specified by a curve. Specifically, FIG. 7 illustrates how the three-dimensional colorspace is adjusted when the user moves the center of the mids color adjustment pad 420 to the right by an amount $\Delta X$. As illustrated in FIG. 7, the mids luminance plane 720 is moved over by the amount $\Delta X$ specified by the user. The other luminance level planes are adjusted in the same direction by an amount specified by a combination of $\Delta X$ and curve 750. In one embodiment, curve 750 is defined as a well-known Bezier's curve. Note that the luminance axis Y is now curved.

Figure 8:
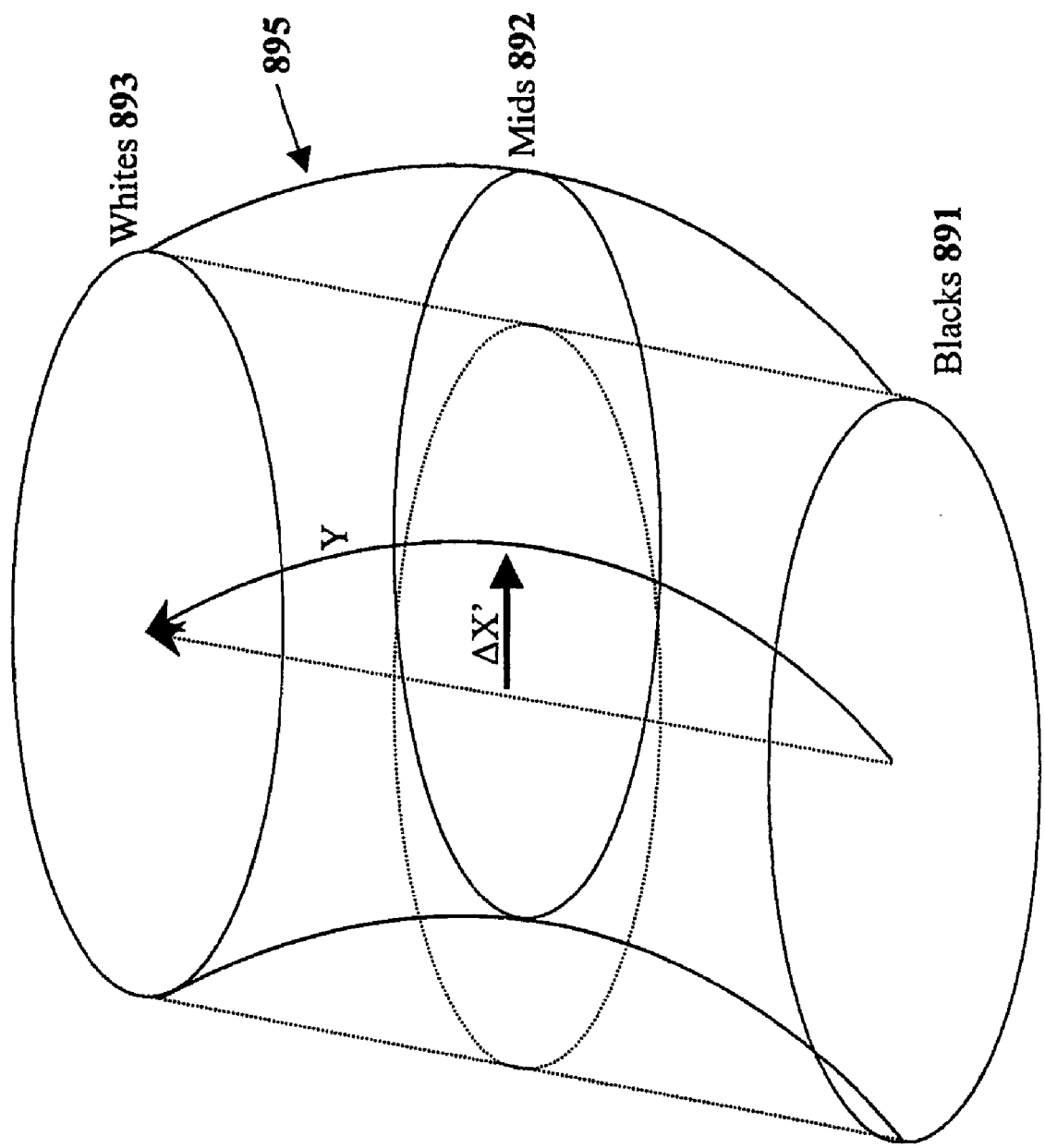
FIG. 8 illustrates the effect of moving the mids luminance plane to the right on a cylindrical colorspace already modified as illustrated in FIG. 6(a).

The movements of the three different color adjustment pads 430, 420, and 410 may be combined to create different colorspace adjustments. For example, the user may first adjust the whites luminance level plane 530 to right by $\Delta X$ using the whites color adjustment pad 430 to produce the adjusted colorspace illustrated in FIG. 6a. The user may then subsequently adjust the mids luminance plane 520 using the mids color adjustment pad 420. FIG. 8 illustrates how the three-dimensional colorspace is appears after the user moves the center of the mids color adjustment pad 420 to the right by an amount of ΔX'. Note that the mids luminance level plan 892 has been shifted by ΔX' but whites luminance level plane 893 and the blacks luminance level plane 891 remain stationary. However, all the other luminance planes are adjusted according to curve 895. Additional details on one implementation of the math behind these color adjustments will be presented later in this document.

Luminance Adjustment Sliders

Referring back to FIG. 4, the graphical user interface further includes three luminance adjustment sliders 439, 429, and 419 associated with each of the three luminance planes illustrated in FIG. 5. Specifically, FIG. 4 illustrates whites luminance slider 439, mids luminance slider 429, and blacks luminance slider 419. The luminance adjustment sliders 439, 429, and 419 adjust the luminance levels of pixels on luminance plane 530, 520, and 510, respectively.

As with the color adjustment pads, the luminance sliders adjust the luminance on their respective luminance planes. The whites luminance slider 439 adjusts the luminance for the pixels on the whites luminance plane 530 and the remaining luminance planes as a function of how close those other planes are to the whites luminance plane as illustrated by the input (x)/output (y) graphs in FIG. 13. Specifically, moving the whites luminance adjustment slider 439 to the right increases the luminance of high luminance pixels as illustrated in FIG. 14(c). Similarly, moving the whites luminance adjustment slider 439 to the left lowers the luminance of high luminance pixels as illustrated in FIG. 14(d). Leaving the whites luminance adjustment slider 439 in the center leaves the high luminance pixels unchanged.

The blacks luminance slider 419 adjusts the luminance for the pixels on the blacks luminance plane 510 and the remaining luminance planes proportionally. Specifically, adjusting the blacks luminance slider 419 to the left decreases the luminance as illustrated by the input(x)/output(y) graphs of FIG. 14(a) and adjusting the blacks luminance slider 419 to the right increases the luminance as illustrated in FIG. 14(b).

Figure 14G:
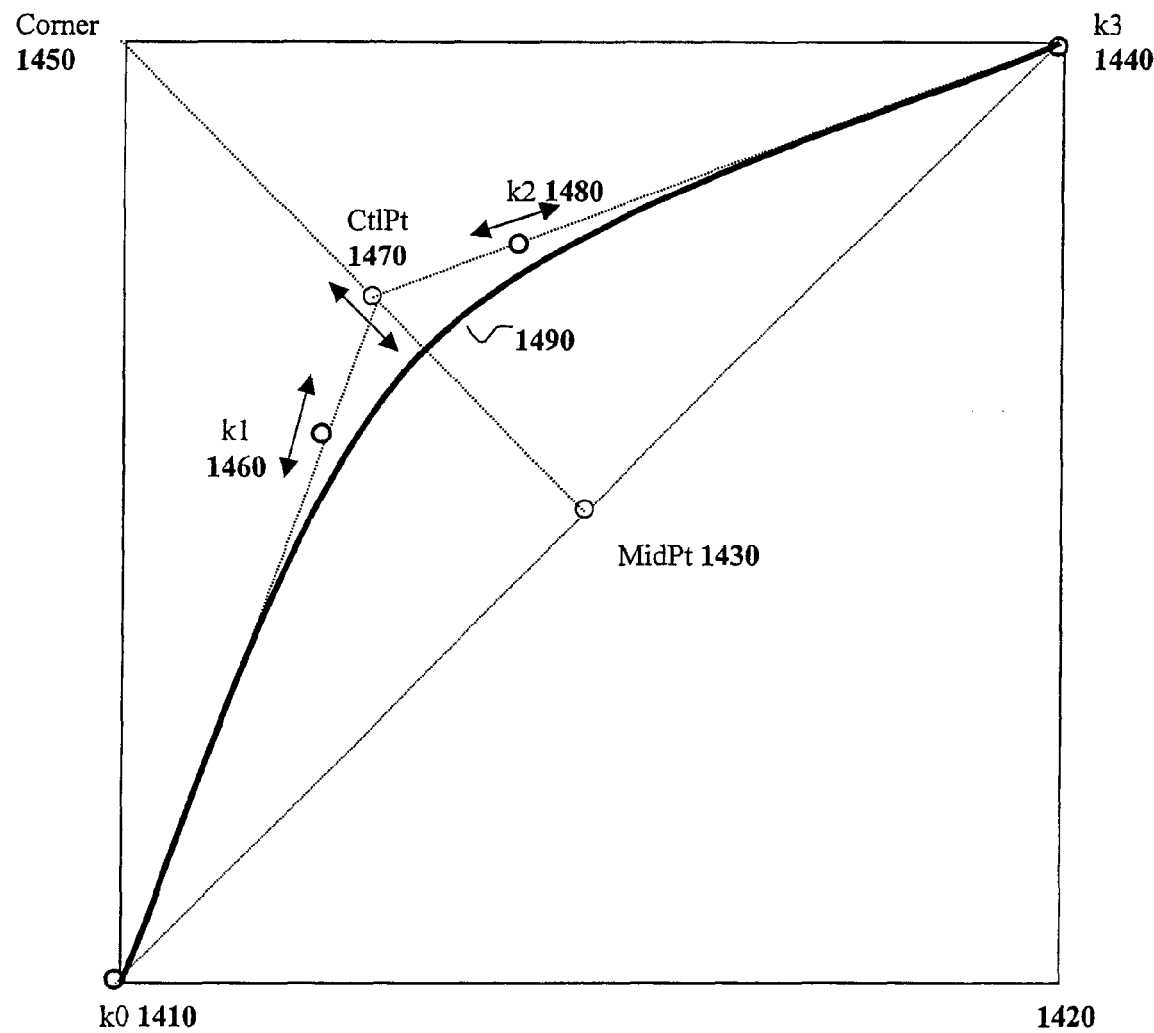

The mids luminance slider 429 adjusts the luminance of pixels on the mids luminance plane 520. In one embodiment, the adjustment to the mids luminance slider adjusts the other luminance planes in a curved manner according to a curve as illustrated in FIGS. 14(e) and 14(f). Specifically, moving the mids luminance slider 429 to the right raises the luminance of the mids as illustrated in FIGS. 14(e) and 14(g) and moving the mids luminance slider 429 to the left lowers the luminance of the mids as illustrated in FIG. 14(f).

Auto-Contrast Buttons

In the center of the graphical user interface of FIG. 4 is a set of auto-contrast buttons 460. The auto-contrast buttons 460 are used to analyze a frame of the image being manipulated and then automatically adjust the luminance of the image. Specifically, the auto-contrast buttons 460 automatically adjust the blacks luminance slider 419 and whites luminance slider 439 to values which will expand or contract the luma values in the original images to fall into the maximum CCIR-recommended luma ranges (16 and 235).

Referring to the auto-contrast buttons 460 in FIG. 4, the specific auto-contrast buttons from left to right are: auto-black-level, auto-contrast, auto-white-level. The Auto-black-Level button will adjust the blacks slider to make the lowest input luma value map to CCIR-black (16). The Auto-White-Level button will adjust the highest input luma value to map to a user-specified white value. This user-specified white value is normally CCIR-white (235). The auto-contrast button performs both operations (auto-black-level and auto-white-level) in one step.

These auto-contrast buttons 460 are highly desirable since one of the tasks that professional colorists often perform is to adjust the black and white levels to see what contrast the original image has. After seeing the contrast in the original image, the colorist may increase (or decrease) the image's contrast as appropriate.

Saturation Adjustment Slider

Referring again to FIG. 4, a saturation adjustment slider 450 can be used to adjust the saturation of all the pixels. The saturation adjustment slider 450 adjusts the saturation of the effected pixels by multiplying each pixel's current saturation value with a saturation multiplier value between zero and two.

Adjusting the saturation with a saturation multiplier value of zero would change all the pixels to zero saturation, resulting in a Black and white image. Adjusting the saturation with a saturation multiplier value of two would double the saturation of each pixel. Leaving the saturation adjustment slider 450 in the center position multiplies the saturation by a value of one and thus does not change the saturation of the pixels.

Limit Effect Panel

To limit the effects of color correction, the user may define a limited three-dimensional space within the three-dimensional colorspace that should be adjusted. Referring to FIG. 4, the "limit effect" panel 460 at the bottom of the graphical user interface allows the user to specify a limited volume within the colorspace by selecting a particular hue range, saturation range, and luminance (luma) range. Limiting the effected pixels is also known as "keying."

Referring back to the colorspace illustration of FIG. 1(b), an example of a defined three-dimensional space 150 within the three-dimensional colorspace is illustrated. Three-dimensional space 150 is defined with a Δy luminance range, a Δs saturation range, and a Δh hue angle range. Not all three parameters need to be specified. If a particular parameter is not specified, then the entire range of that parameter will be adjusted with the color corrections. If no parameter is specified, then all the pixels will be affected.

Referring back to the limit effect panel 460 of FIG. 4, a user may specify a Δh hue angle range by marking the hue angle range checkbox 478 (which indicates that the Δh hue angle range should be considered) and defining a hue angle range on the hue spectrum 470. The Δh hue angle range is specified along a hue spectrum 470 using a pair of defining hue markers 471 and 472.

The angle determined by the defining hue markers 471 and 472 is used to allow the user to generate a smooth falloff for the color effect. For colors completely inside the defining hue markers 471 and 472, the effect is applied 100%. For colors completely outside the defining hue markers 471 and 472, the effect is not applied. For colors that fall into the "falloff area" which the user specifies by the angle of the defining hue markers 471 and 472, the resulting pixel is calculated by blending the original, unmodified pixel with the pixel after the effect has been applied. The effect is proportional to where the original pixel color is in the falloff area. Thus, the angled defining hue markers 471 and 472 allows for a smooth gradation between pixels subject to the effect and pixels not subject to the effect.

The user may press hue angle reset button 477 to reset the defined hue angle to a default hue angle. In one embodiment, the default hue angle is −110° with a default width of 15° and a default softness of 10. The user may center the hue spectrum 470 on a particular hue by selecting a hue from the image using eyedropper button 474.

A user may specify a Δs saturation range by marking the saturation range checkbox 488 and defining a saturation range on the saturation scale 480. The Δs saturation range is specified along the saturation scale 480 using a pair of defining saturation markers 481 and 482. As set forth with reference to the defining hue markers 471 and 472, the angle determined by the defining saturation markers 481 and 482 is used to allow the user to generate a smooth falloff for the color correction. The user may press saturation range reset button 487 to reset the defined saturation range to a default saturation range. In one embodiment, the default saturation range starts at 35% with a width of 40 and a softness of 20. The user may center the saturation markers 481 and 482 around a particular pixel's saturation value by selecting a pixel from the image using eyedropper button 474.

Finally, a user may specify a Δy luminance range by marking the luminance range checkbox 498 and defining a luminance range on the luminance scale 490. The Δy luminance range is specified along the luminance scale 490 using a pair of defining luminance markers 491 and 492. As set forth with reference to the defining hue markers 471 and 472, the angle determined by the defining luminance markers 491 and 492 is used to allow the user to generate a smooth falloff for the color correction. The user may press luminance range reset button 497 to reset the defined luminance range to a default luminance range. In one embodiment, the default luminance range starts at 0% with a width of 40 and a softness of 20. The user may center the luminance markers 491 and 492 around a particular pixel's luminance value by selecting a pixel from the image using eyedropper button 474. Furthermore, if the user activates the eyedropper while holding the shift key down then the hue, saturation, or luminance on which the user clicks will be added to the keying selection.

Alternative Color Correction Graphical User Interfaces

The graphical user interface for the color correction window may be implemented in many different manners. The different color correction graphical user interface embodiments may include new features and omit other features.

Figure 9:
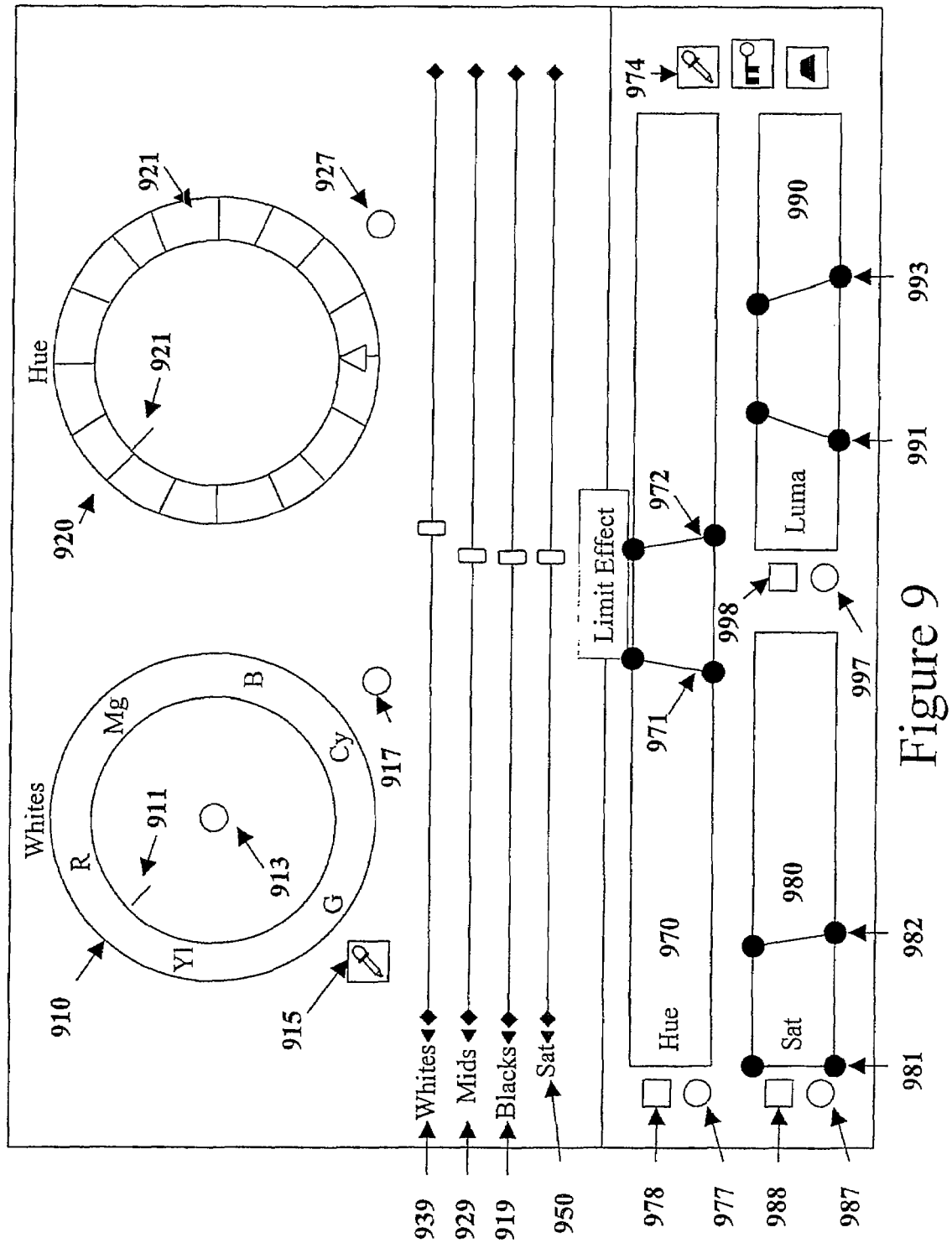
FIG. 9 illustrates a first alternate embodiment of a graphical user interface for the color correction window 230 of the color correction control system in FIG. 2.

FIG. 9 illustrates a first alternate embodiment of a color correction user interface. In the embodiment of FIG. 9, there is only a single color adjustment pad 910 for adjusting the whites luminance plane 530 as illustrated in FIG. 5. Thus, in the embodiment of FIG. 9, only the whites luminance plane 630 may be adjusted as illustrated in FIG. 6(a). However, the embodiment of FIG. 9 includes all three luminance adjustment sliders 939, 929, and 919 such that the luminance levels of all three different luminance planes 530, 520, and 510 may be adjusted accordingly.

Hue Phase Shift Adjustment

The color correction embodiment of FIG. 9 introduces a new color adjustment device, the hue adjustment wheel 920. The hue adjustment wheel 920 allows the user to simultaneous adjust the hues of all the pixels (defined by the limit effect panel) by rotating the colorspace. Specifically, a user may rotate the outer wheel 921 to rotate the hue spectrum. This causes the entire colorspace to be rotated by a corresponding amount as illustrated by the arrow 521 in FIG. 5. This type of color change is sometimes known as a hue phase shift. To reset any hue phase shift changes, the user may activate the hue rotation reset button 527 to move the hues back to their original (default) position.

Figure 10:
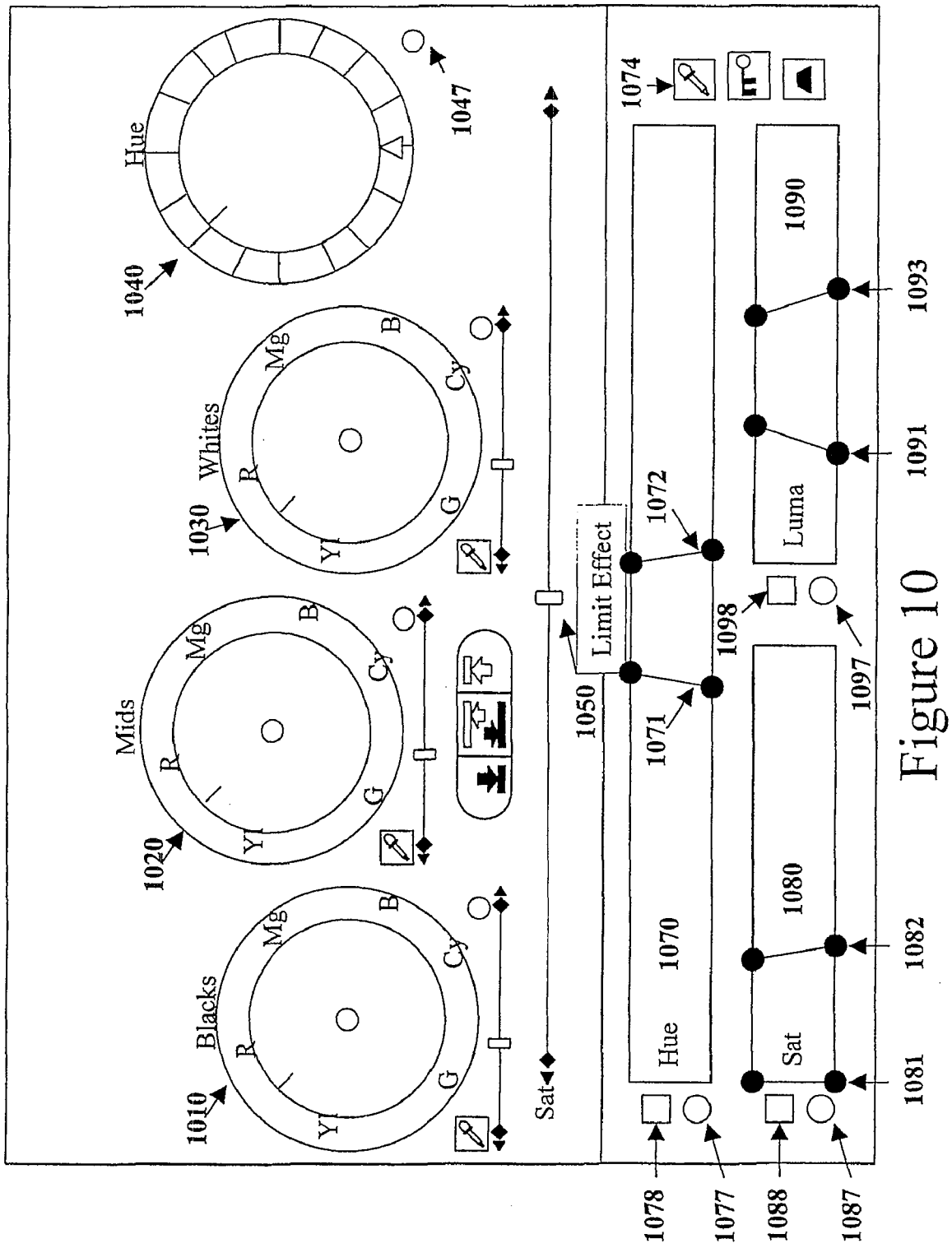
FIG. 10 illustrates a second alternate embodiment of a graphical user interface for the color correction window 230 of the color correction control system in FIG. 2.

FIG. 10 illustrates a second alternate embodiment of a color correction user interface. In the embodiment of FIG. 10, there are three color adjustment pads 1010, 1020, and 1030 as well as a hue adjustment wheel for adjusting the hues in a colorspace. The color correction user interface of FIG. 10 is very powerful since it contains all the features of the previous two user interfaces, but the color correction user interface of FIG. 10 is slightly cluttered.

Color Correction Implementation

The present invention provides for color correction in a novel manner by performing the color correction and keying in the YUV colorspace in order to reduce processing cycles and to save time through the avoidance of rendering. This is in marked contrast to prior art techniques that perform color correction in the RGB space and, thus, tend to involve greater amounts of rendering. By reducing or removing the time consuming rendering steps, the system of present invention is more efficient than prior art systems.

As will be described more fully in the sections hereafter, the inventive techniques utilize look-up tables (LUTs) that may convert user inputted color corrections to the YUV or YCrCb colorspace in selected images to an outputted value. Although YUV and YCrCb denote different values mathematically, for purposes of the present invention, YUV and YCrCb are deemed interchangeable as used herein. The look-up tables (LUTs) that provide for the remapping of pixels according to the user's desired color correction are used to provide a high performance pixel remapping. However, the color correction pixel remapping performed by the present invention may be implemented in other manners.

To fully describe the implementation of all the different features, the implementation will be described with reference to the color correction graphical user interface of FIG. 10. The color correction graphical user interface of FIG. 10 includes user interface devices for adjustment of color space shifting, hue phase shift, luminance levels, and saturation.

Figure 11:
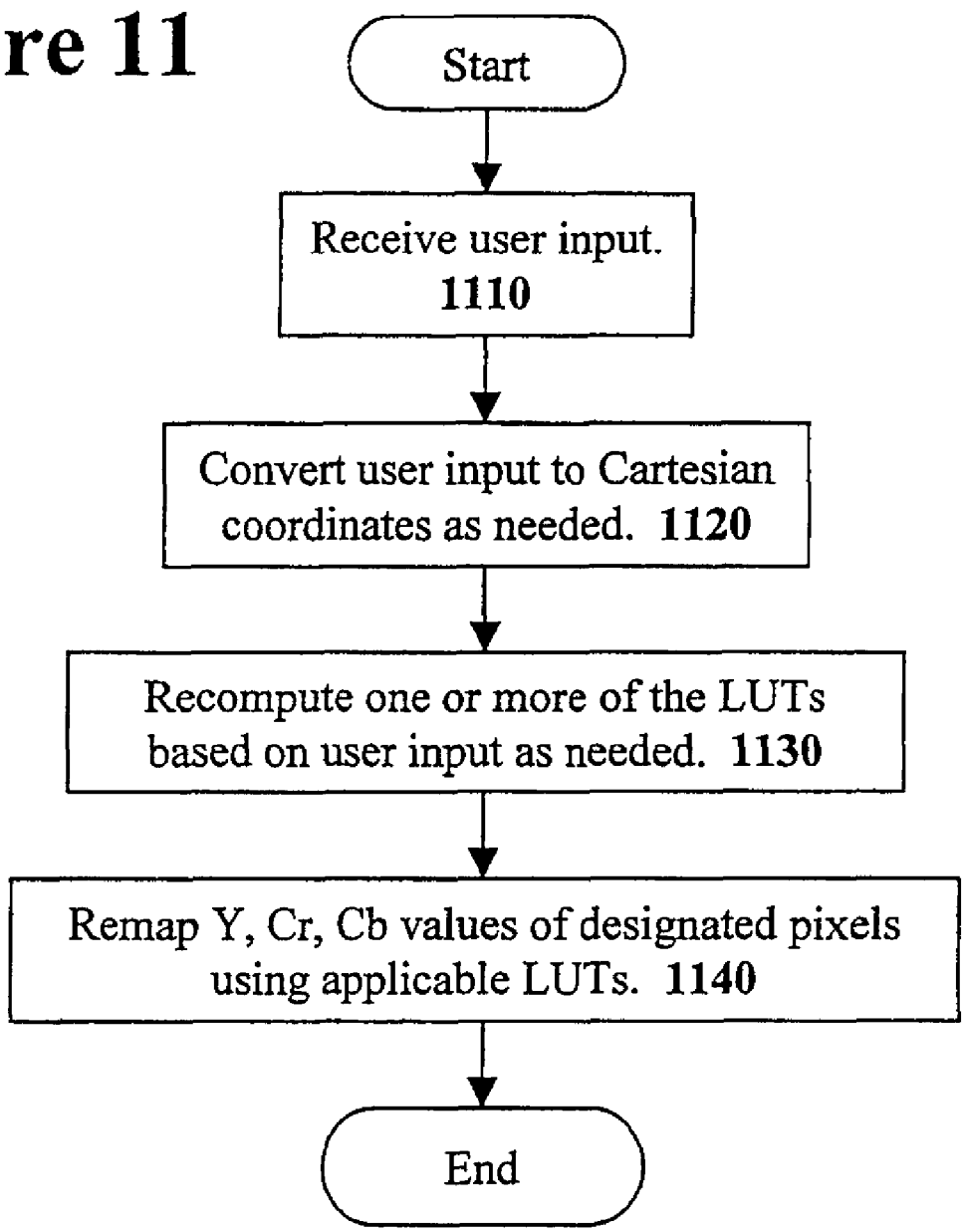
FIG. 11 illustrates a flow diagram of one color correction implementation that performs color correction using look-up tables recomputed based upon user input from a graphical user interface.

FIG. 11 illustrates a flow diagram containing, a segment of the inventive technique in one embodiment. User input representing the desired color correction is received at 1110 for a given color space. The user input may be provided using of the graphical user interfaces depicted in FIG. 4, 9, or 10. In one embodiment, the user input from the color adjustment pads may be in the form of a vector that is converted at 1120 to Cartesian coordinates for computational purposes. In another embodiment, however, it is possible to have the user input directly in the form of Cartesian coordinates, without the use of vectors.

Once Cartesian coordinates form, a recomputation of the applicable look-up tables (LUTs) is performed at 1130, the details of which will be discussed in greater detail below. Note that in certain applications, however, it may not be necessary to recomputed one or more LUTs, given that it is possible that a user may only modify a parameter that does not require a look-up table recomputation such as a saturation adjustment. Finally, the color information of designated pixels are remapped at step 1140. In one embodiment, the YCrCb values that define the designated pixels are remapped with the aid of the recomputed from the look-up tables (LUTs).

Figure 12:
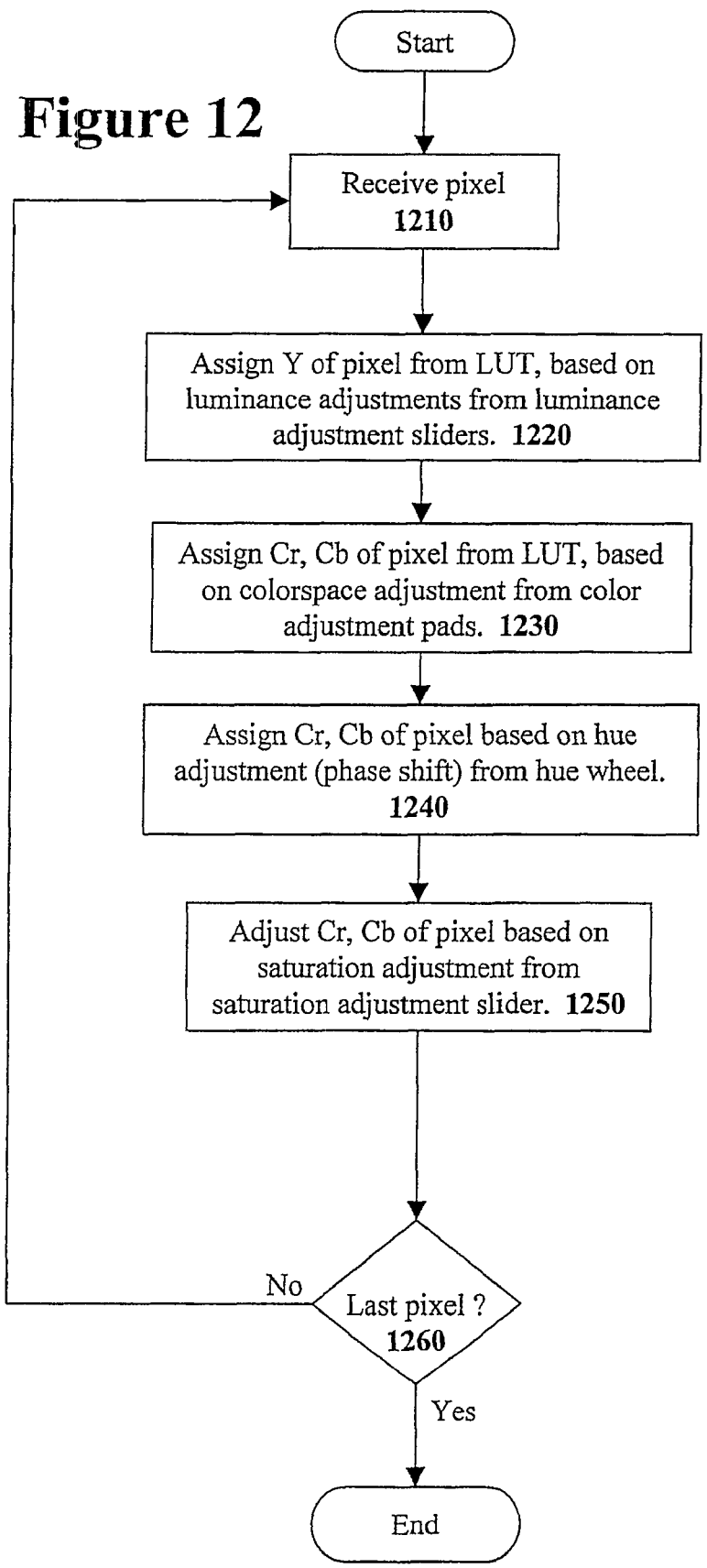
FIG. 12 illustrates a flow diagram describing pixel remapping using the color correction system of the present invention.

FIG. 12 illustrates a flow diagram describing the pixel remapping referred to in step 1140 of FIG. 11. The pixel color correction may begin by receiving a pixel at step 1210.

Based on user input from the previously described luminance adjustment sliders, an adjustment to the pixel's luminance is made at step 1220 based on the luminance look-up tables (LUTs), as described in greater detail hereafter. Specifically, the luminance (Y) of a pixel is set with the following equation:

$$Y=yLUT(Y) \text{ where Y is the pixel's luminance value}$$

As such, the previously described luminance adjustment sliders are able to provide user control of the luminance (Y) value of a YCrCb defined pixel.

Next, an adjustment to the chrominance is made at 1230 based on the chrominance look-up tables (LUTs) that have been modified based on user input from the color adjustment pads as previously disclosed. Note that the chrominance adjustment is relative to the initial chrominance value. The chrominance values are adjusted with the following equations:

$$Cb=Cb+\text{signedCbLUT}(Y); \text{ and}$$

$$Cr=Cr+\text{signedCrLUT}(Y) \text{ where Y is the pixel's luminance value}$$

As such, the previously described color adjustment pads are able to provide user control of the chrominance (Cr and Cb) values of a YCrCb defined pixel.

Also as previously described, the color correction user interface may include a hue adjustment wheel that may rotate the hues of pixels. The hue rotation may be expressed as a phase shift h. In accordance with one embodiment, a final assignment of chrominance is made, based on any existing phase shift h, at step 1240. The phase shifted chrominance values are determined from the previous chrominance values and the phase shift h. The general equations for this determination are:

$$Cb=Cb*\cos(h)-Cb*\sin(h); \text{ and}$$

$$Cr=Cr*\cos(h)-Cr*\sin(h).$$

In systems without a hue adjustment wheel for phase modification h, there would be no need for step 1240 of FIG. 12.

A final adjustment is made to a pixel's Cr and Cb values at step 1250, based on a saturation adjustment s. The saturation adjustment s (or satadjust) may increase or decrease the amount of color depending on user input using the saturation adjustment slider. This increase or decrease is accomplished by setting the saturation adjustment s to a value between 0 and 2 inclusive and then multiplying the above final color correction results by the factor of s to get the final adjusted color correction. Specifically, the following equation may be used to implement saturation adjustments to the pixels:

$$Cb=128+(\text{satadjust}*(Cb-128)); \text{ and}$$

$$Cr=128+(\text{satadjust}*(Cr-128))$$

Although it is possible to use other s values beyond the range of 0 and 2, such values tend to have little utility, given that the extremes of 0 to 2 represent the mainstream uses of color, where 0 represents no saturation, and 2 represents double the normal saturation for any given color.

Steps 1210 through 1250 are then repeated until the last pixel from the designated image(s) has been remapped, as determined at 1260.

Luminance Correction: LUT Recomputations

As set forth in the flow diagram of FIG. 12, the first pixel adjustment in one embodiment of the present invention is to adjust the pixel's luminance (Y) value. The adjusted luminance value is based on the pixel's current luminance value and input from the user on the luminance sliders in the graphical user interface. The user input is used to adjust a luminance look up table that will be used to modify the luminance of each affected pixel.

Figure 13:
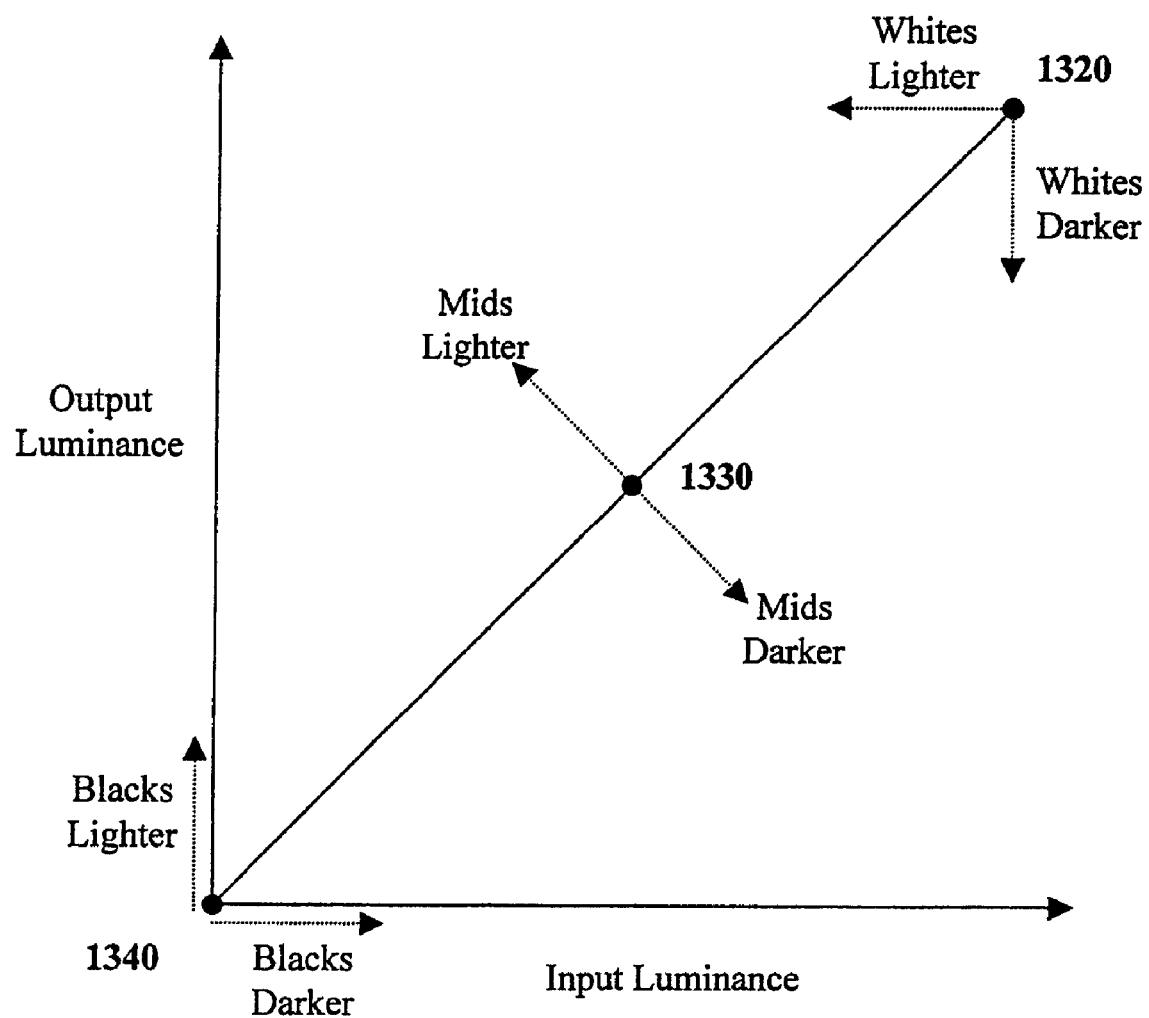
FIG. 13 illustrates a graphical representation of an exemplary range of potential transitions for the different pixel luminance input versus pixel luminance output relationships within a lookup table for luminance correction.

FIG. 13 illustrates a graphical representation of the potential transitions for the relationship between the different pixel luminance input values on the input (x) axis 1305 versus the respective pixel luminance output values on the output (y) axis 1310. As previously set forth, a user may adjust the luminance adjustment sliders in order to modify luminance control values W, M, and B.

The changes of in the luminance control values W, M, and B adjust the input/output graph as set forth in FIG. 13. Specifically, changes to the W luminance control value may adjusts the input/output graph in the directions indicated at 1320, changes to the M luminance control value may adjust the input/output graph in the directions indicated at 1330, and changes to the B luminance control value may adjust the input/output graph in the directions indicated at 1340.

FIGS. 14(*a*) to 14(*g*) illustrate more specific examples which are controlled for movement of individual variables in accordance with the previously described user interface. Specifically: FIG. 14(*a*) illustrates the resulting input/output graph where the B value has been made darker, as seen by the movement of the B from the origin point out along the x axis; FIG. 14(*b*) illustrates the resulting input/output graph where the B value has been made lighter, as seen by the movement of the B from the origin point out along they y axis; FIG. 14(*c*) illustrates the resulting input/output graph where the W value has been made lighter, as seen by the movement of the W back along the x axis; FIG. 14(*d*) illustrates the resulting input/output graph where the White W value has been made darker, as seen by the movement of the W down along the y axis; FIG. 14(*e*) illustrates the resulting curved input/output graph where the M value has been lifted up, as seen by the movement of the M in an upward direction; FIG. 14(*f*) illustrates the resulting curved input/output graph where the M value has been moved down, as seen by the movement of the M in a downward direction. It is significant to note that FIGS. 14(*e*) and 14(*f*) differ markedly from FIGS. 14(*a*) to 14(*d*) in that the input/output relationship of the latter is marked by a straight line (and hence, is computed according to a general linear equation such as y=mx+b), while the input/output relationship of the former is computed by any non-linear equation as known in the art of curve computation, such as a Bezier function.

Although there are other techniques that would yield similar curves using different mathematical approaches, in one embodiment, a Bezier function is utilized. Accordingly, FIG. 14(*g*) details, for one embodiment, the usage of an exemplary Bezier curve 1490 and the control points k0 1410, k1 1460, k2 1480 and k3 1440 of the Bezier curve function which are used to compute the non-linear input/output relationship on the look-up table which correlate to M control modifications. More specifically, the Bezier control points k0 1410, k1 1460, k2 1480 and k3 1440 for the luminance map are set up based on the endpoints and the previously described M adjustment slider.

In one embodiment, the curve for the M control is calculated using Bezier control points k0 1410, k1 1460, k2 1480 and k3 1440. The endpoints k0 1410 and k3 1440 for the Bezier curve are calculated the same way as they would be for a linear case, as shown in FIGS. 14(*a*) to 14(*d*), and are derived solely from the blacks luminance slider 419 and whites luminance slider 439 of FIG. 4. MidPt 1430, Corner 1450, and CtlPt 1470 are all intermediate values used to illustrate how k1 1460 and k2 1480 are derived from k0 1410, k3 1440, and the previously described M adjustment slider, the middle Bezier control points (k1 1460, k2 1480) are calculated as follows.

First, a calculation is made for the midpoint between k0 1410 and k3 1440. Specifically:

$$MidPt \cdot h = \frac{(k0 \cdot h + k3 \cdot h)}{2}$$

A similar expression may be likewise employed for midPt.v. Next, a choice is made designating either the upper left or lower right, depending on the direction M is being pushed, such that:

If M<100, lower right, then Corner.h=k3.h and Corner.v=k0.v

Else if M>100, upper left, then Corner.h=k0.h and Corner.v=k3.v.

Next, a calculation is made as to how far out to go on the line between MidPt 1430 and Corner 1450. Specifically, CtlPt 1470 is interpolated by using a weighting derived from weight=abs((mids−100)/100.0) where the larger the M ("mids") value, the more influence that Corner 1470 will have. Conversely, the smaller the value, the less influence Corner 1470 will have, e.g.:

$$CtlPt.h = weight*Corner.h + (1.0-weight)*MidPt.h$$

A similar expression may be employed to obtain CtlPt.v.

Next, a calculation is made to determine k1 1460, by interpolating between k0 1410 and CtlPt 1470, again using the above-described weighting factor:

$$k1 \cdot h = \left(\frac{0.5 + (1.0 - \text{weight})}{2}\right) * CtlPt \cdot h + \left(\frac{1.0 - 0.5 + (1.0 - \text{weight})}{2}\right) * k0 \cdot h$$

A similar expression may be employed to obtain k1.v.

Likewise, a calculation is made to determine k2 at 1480:

$$k1 \cdot h = \left(\frac{0.5 + (1.0 - \text{weight})}{2}\right) * CtlPt \cdot h + \left(\frac{1.0 - 0.5 + (1.0 - \text{weight})}{2}\right) * k3 \cdot h$$

A similar expression may be employed to obtain k2.v.

FIG. 14(g) illustrates where these points would lie relative to k0 1410 and k3 1440 for M>100. As M (and therefore the above described "weight") is changed, CtlPt will be interpolated to different locations along the line between Corner 1450 and MidPt 1430. Furthermore, k1 1460 and k2 1480 will be interpolated to different positions on the lines between k0 1410 and CtlPt 1470 and between k3 1440 and CtlPt 1470. The arrows at k1 1460, CtlPt 1470, and k2 1480 suggest how these points move as the mids (M) luminance slider is adjusted (in the range 100-200).

Note that if M<100, then the lower right corner of the bounding box formed by (k0, k3) would be used as Corner, and the curve would then inflect in the other direction, but otherwise, the relative positioning of the points (based on "weight") is the same. If, however, M was set to 100, the graph would instead be a straight line as shown in FIG. 14(a) to 14(d).

Chrominance (U and V) Correction: LUT Recomputations

As discussed with reference to FIG. 12, the second adjustment in one embodiment of the present invention is a pixel chrominance adjustment based on input from the user on the color adjustment pads. Adjustments to the color adjustment pads skew the three-dimensional color space such that the chrominance value for each pixel must be changed. For example, FIG. 6(b) illustrates how the three-dimensional colorspace is adjusted when the user moves the center of the blacks color adjustment pad 410 to the right by an amount ΔX. In mathematical terms, the effect of an adjustment of ΔX to the whites (W) luminance plane or blacks (B) luminance plane on the mids (M) luminance plane would be that of Δx/2 for a movement of Δx by W or B, as depicted in FIGS. 6(a) and 6(b). An adjustment to the mids (M) luminance plane would affect the cylindrical representation along the Bezier shaped luminance axis (Y) as broadly depicted in FIG. 7, and as will be more fully detailed in the below exemplary applications.

When a user makes adjustments to a color adjustment pad, the user's input may be received as an angle and magnitude defined vector. The angle and magnitude defined vector is then translated into a relative U, V vector for that luminance plane. For example, referring to FIG. 5, a vector input for the white color adjustment pad would be translated into a Cartesian vector with a $U_W$ value specifying a relative move along the U-axis and a $V_W$ value specifying a relative move along the V-axis. Thus, for the example of FIG. 6(a), the relative Cartesian vector would be $U_W = \Delta X$ and $V_W = 0$.

To convert an angle vector push defined by magnitude m and an angle α, the Cartesian vector U and V can be found according to the generalized equations:

$$U_W = m_W * \sin \alpha_W \quad V_W = m_W * \sin \alpha_W$$

$$U_M = m_M * \sin \alpha_M \quad V_M = m_M * \sin \alpha_M$$

$$U_B = m_B * \sin \alpha_B \quad V_B = m_B * \sin \alpha_B$$

Figure 15:
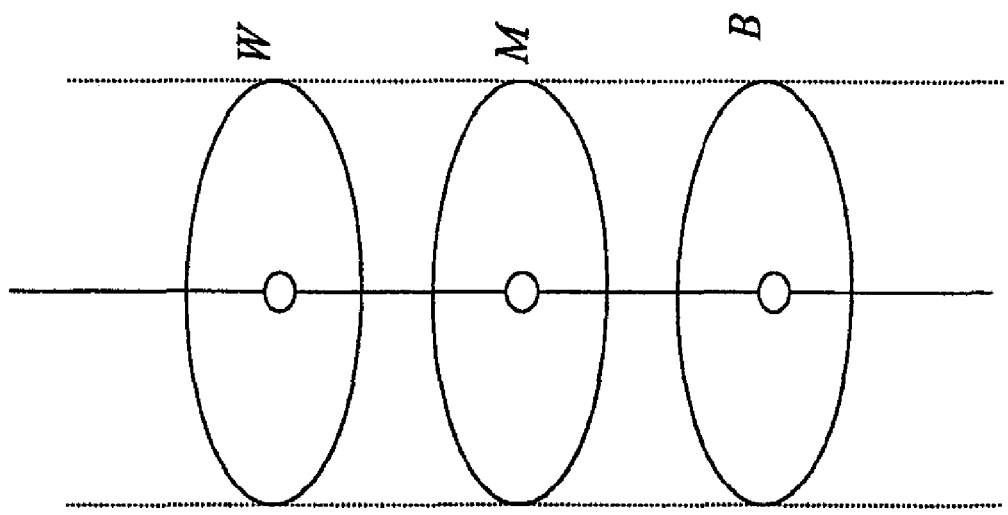
FIG. 15 illustrates an unmodified cylindrical colorspace representation where the white (W), mid (M), and black (B) luminance planes are all physically centered on the Cb=0, Cr=0 axis, and where none of the values $U_W, V_W, U_M, V_M, U_b, V_b$ have been modified.

FIG. 15 illustrates an unchanged cylindrical colorspace representation where the white (W), mid (M), and black (B) luminance planes are physically centered on the Cb=0, Cr=0 axis. Thus, in FIG. 15, all of the relative Cartesian vector values $U_W$, $V_W$, $U_M$, $V_M$, $U_B$, $V_B$ are zero. In FIG. 15, the Cb look-up table (CBLUT) and the Cr look-up table (CrLUT) are both of the form y=0, a constant of zero. Applying the functions CbLUT and CrLUT, for any luminance value, the result is always CbLUT[luminance]=0.0 and CrLUT[luminance]=0.0.

Figure 16:
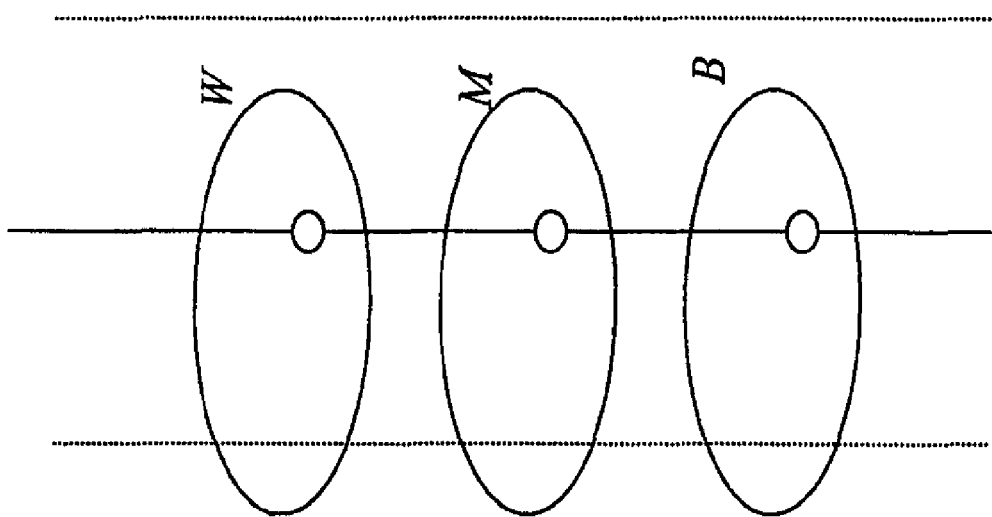
FIG. 16 illustrates a cylindrical colorspace representation where the white (W), mid (M), and black (B) luminance planes have been pushed an equal amount to reflect changed Cb and Cr values regardless of luminance.

FIG. 16 illustrates another example of the cylindrical colorspace representation where the white (W), mid (M), and black (B) luminance planes have all been shifted such that each has been pushed an equal amount to reflect different amounts of Cb and Cr values. As in the previous diagram, the vertical line in FIG. 16 is centered on the Cb=0, Cr=0 location for all three luminance planes. In FIG. 16, Cb has been pushed by −0.30 and Cr has been is pushed by 0.10. Thus, CbLUT and CrLUT are both of the form y=C (e.g., a constant) given that the same amount of push is applied to Cb and Cr regardless of luminance. Specifically, for all luminance values, CbLUT[luminance]=−0.30 and CrLUT[luminance]=0.10.

Figure 17:
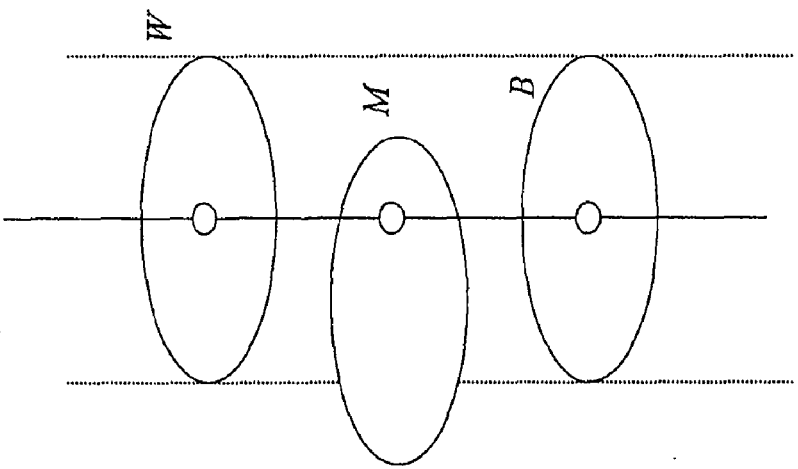
FIG. 17 illustrates a cylindrical colorspace representation where the white (W), mid (M), and black (B) luminance planes have been pushed such that Cb has been pushed negative at M, but B and W remain the same.

FIG. 17 illustrates a more complex example of adjusting the cylindrical colorspace representation where the white, mid, and black luminance planes are being pushed differently. To interpolate the adjustments for the luminance planes in between the white, mid, and black luminance planes, a Bezier curve is used. Although this implementation uses a Bezier function to generate a curve that users have found to be appropriate for the given color correction, other functions that generate similar curves and even other curves may also be used.

Figure 19:
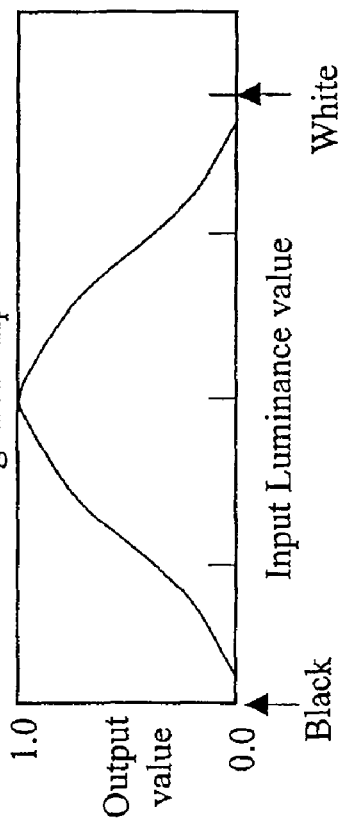
FIG. 19 illustrates the gMidRamp function that can be used to calculate a look up table for Cb and Cr across the various luminance levels.
Figure 20:
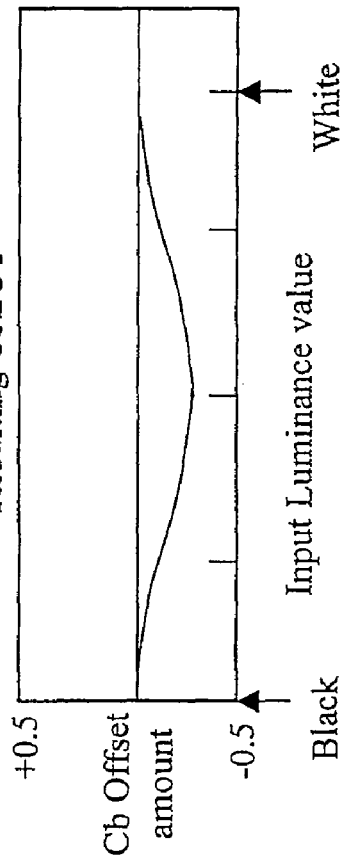
FIG. 20 illustrates the look up table that provides a Cb offset amount for a given luminance input, as a result of the application of the gMidRamp function to the modified colorspace of FIG. 17.
Figure 18:
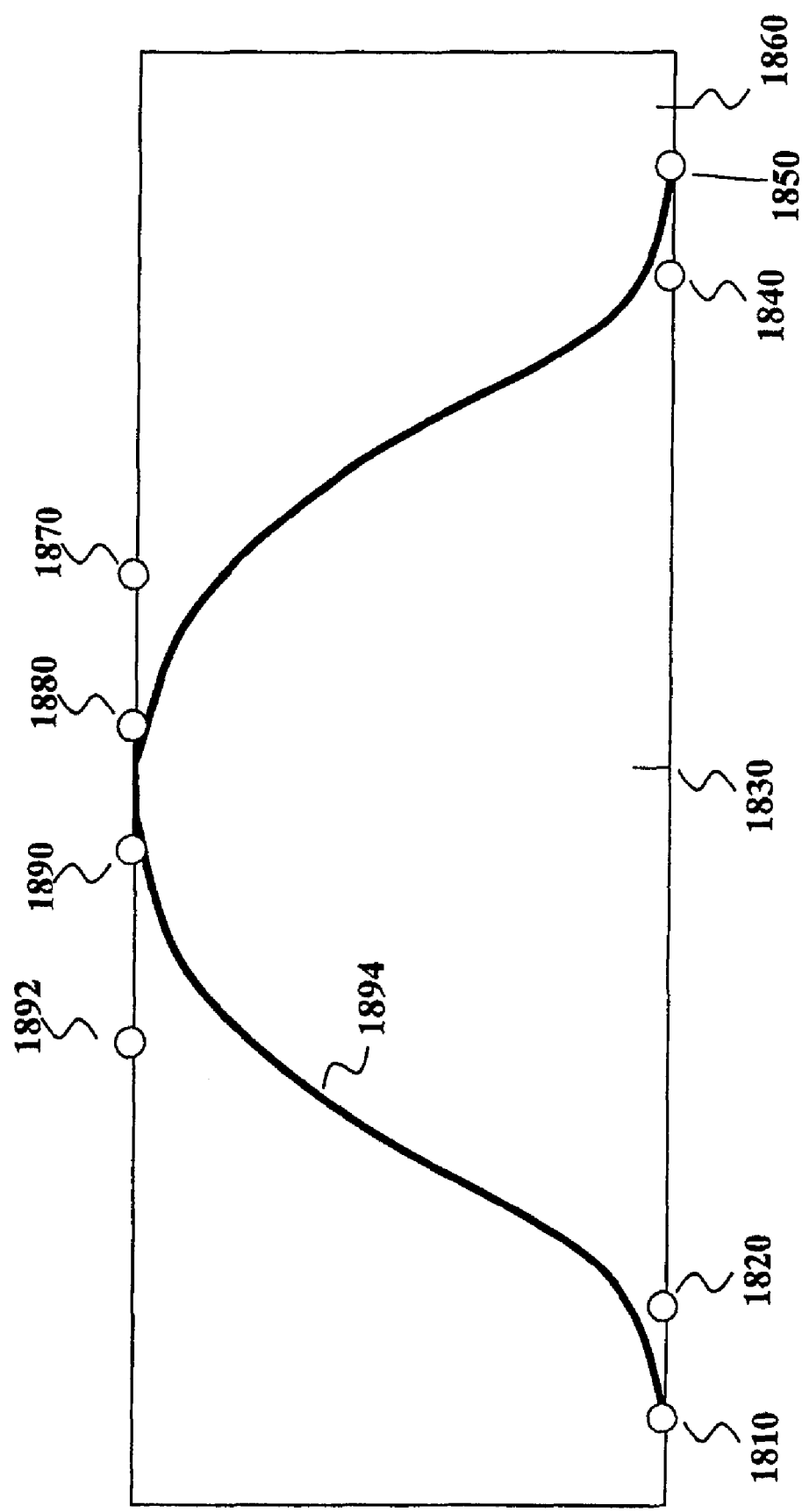
FIG. 18 illustrates the abstract control points that form the basis for an exemplary Bezier curve function called "gMidRamp".

FIG. 18 illustrates a graph 1894 created from two Bezier curves connected by a linear segment (between 1890 and 1880), with theoretical control points (1810, 1820, 18910, and 1892) and (1880, 1870, 1840, and 1850). Utilizing the graph 1894 created from two Bezier curves connected by the linear segment, a more specific instantiation may be arrived at such as in FIG. 19, where the graph created from two Bezier curves and the linear segment is termed "gMidRamp". The gMidRamp, as detailed in the below mathematic equations, is used to generate look up table for Cb, (CbLUT) as illustrated in FIG. 20 and a look-up table for Cr (not shown).

Referring back to FIG. 18, the Bezier control points for gMidRamp may accordingly be derived where the detailed control points assume that luma=0 corresponds to CCIR-black and luma=219 corresponds to CCIR-white (and values above 219 are superwhite). Additional assumptions in this illustrative case are such that: (1) the lookup table size is assumed to be 256; (2) the lookup table is pre-initialized below 55 with 0 and above 164 with 0; (3) the lookup table is pre-initialized between 55 and 164 with 1.0; (4) the Bezier curves are placed with a left endpoint (0,0) at array index 4 (1810) and right endpoint (1.0, 1.0) at array index 104 (1890), and control points of (0.25, 0.0) (1820) and (0.75, 1.0) (1892), as shown at left side of FIG. 18; and (5) the curves are further placed with a left endpoint (0.0, 1.0) at array index 114 and a right endpoint (1.0, 0.0) at array index 214 (1850), and control points of (0.25, 1.0) (1880) and (0.75, 0.0) (1840), as at right. Hence, from left to right, the circles are control pts k0, k1, k2, k3, and k0, k1, k2, k3. The graph starts at 0, and tick marks represent 50% luma (114.5) and CCIR-white (219) (1860).

Referring back to FIG. 17, the relative Cartesian vectors $(U_W, V_W)$ and $(U_B, V_B)$ are generated directly from the user's inputs to the white and black color adjustment pads. However, the Cartesian vector for the mids (M) luminance plane is a combination of the user input for the blacks and whites luminance planes along with the user's direct input for the mids luminance plane. Specifically, the Cartesian vector for the mids luminance plane $(U'_B, V'_B)$ is generated with:

$$U'_M = \frac{U_W + U_B}{2} + U_M$$

$$V'_M = \frac{V_W + V_B}{2} + V_M$$

where $U_M$, and $V_M$ represent the user's directly specified offset for the mids luminance plane.

Accordingly, to generated the needed Cb look-up table (CbLUT) of FIG. 20, the following equations are used:

for $i$<50% White(CCIR luminance value of 128) then $CbLUT[i] = U_B^*(1.0 - gMidRamp[i]) + U'_M^*(gMidRamp[i])$ for $i$>50% White(CCIR luminance value of 128) then $CbLUT[i] = U_W^*(1.0 - gMidRamp[i]) + U'_M^*(gMidRamp[i])$ Thus, FIG. 20 illustrates the CbLUT function in this example where Cb is pushed a small negative amount on the mids luminance plane (M) (say, approximately −0.3) but has not been pushed at all on the blacks or whites luminance planes.

In this example, Cr is not being pushed at all (No plane has been moved in the V direction) such that CrLUT[i]=0 for all values of i.

FIG. 21 illustrates another example of a modified cylindrical colorspace representation. In the modified the cylindrical colorspace representation of FIG. 21, both the mids and the white luminance planes have been pushed. In this case, the same techniques are used to create the chrominance look-up tables (CbLUT and CrLUT). Note the same gMidRamp function is used.

In the modified cylindrical colorspace representation of FIG. 21, both Cb and Cr are being pushed at the mids (M) luminance plane and only Cb is being pushed at whites (W) luminance plane. Thus, the effect of mids and whites luminance plane adjustments on Cb (from the mids and whites color adjustment pads) can be seen in graph of the Cb look-up table (CbLUT) in FIG. 22 at the mid luminance levels and at the high (white) luminance levels. Referring to FIG. 23, since Cr has only been pushed at the mids luminance plane, the Cr look-up table (CrLUT) is symmetric about the mid luminance level.

Keying To Limit Effects

Figure 24:
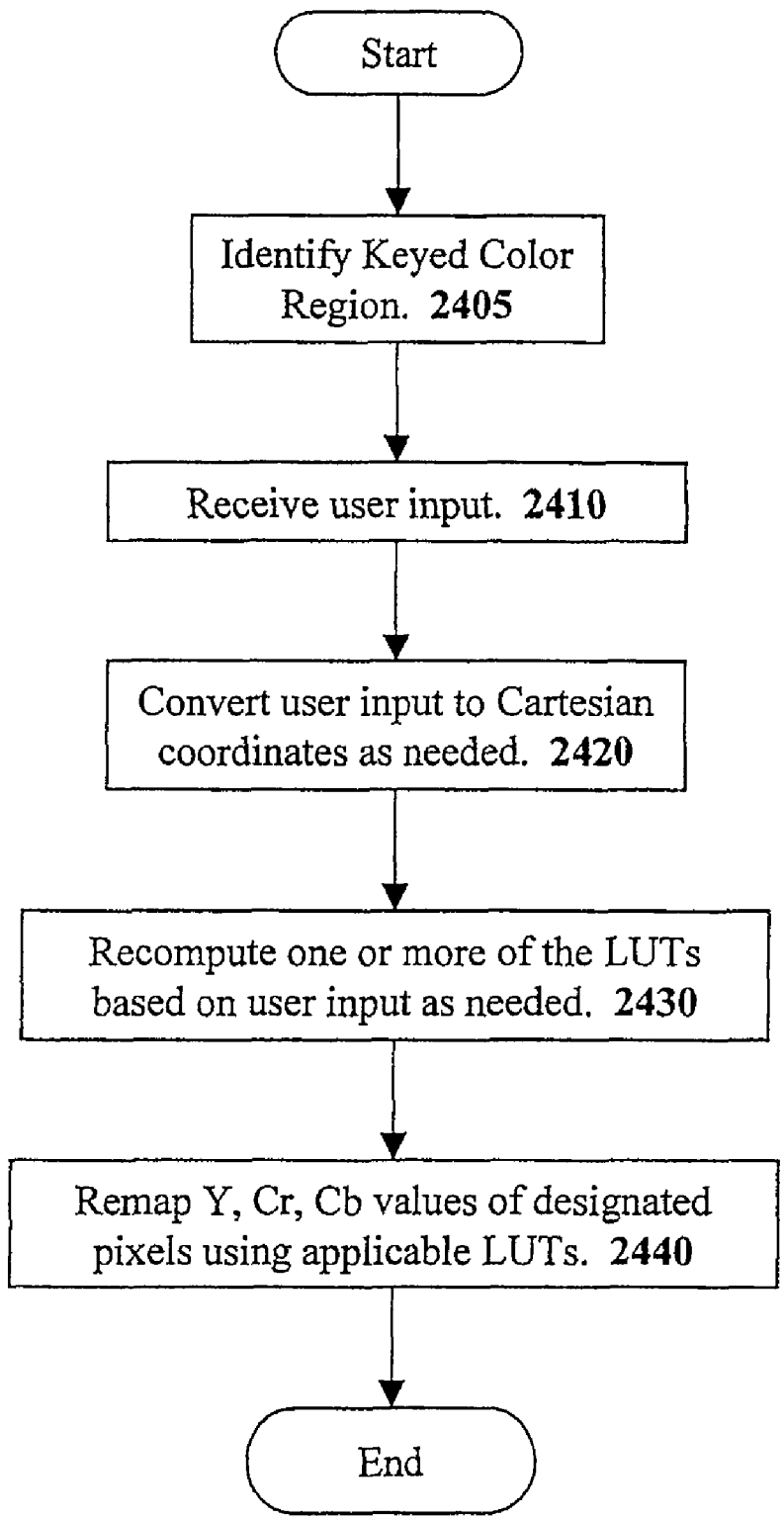
FIG. 24 is a flow diagram illustrating a broad description of the color correction according to the recomputation of YUV values by usage of look up tables in the inventive technique for keyed pixels.

In one embodiment, keying may be employed to limit the effect of color correction. FIG. 24 illustrates a broad description of the inventive color correction system according to the recomputation of YUV values by usage of look up tables as described for a keyed area. As indicated at 2405, the first step and differentiating step from the process outlined in FIG. 11 involves identifying a keyed color region. Generally speaking, the techniques of keying may be used to identify or designate an entire image or images, as well as specific portions thereof, or even may be applied to specific object or backgrounds, as known in the art of keying. Additionally, the key may be partial (semi transparent) in which case the color connected result is mixed with the uncorrected (original) pixel, allowing for a smooth transition between corrected and uncorrected areas of the images when using the Limit Effect panel. In one embodiment, keying is performed using the limit effect panel 460 of FIG. 4.

Figure 25:
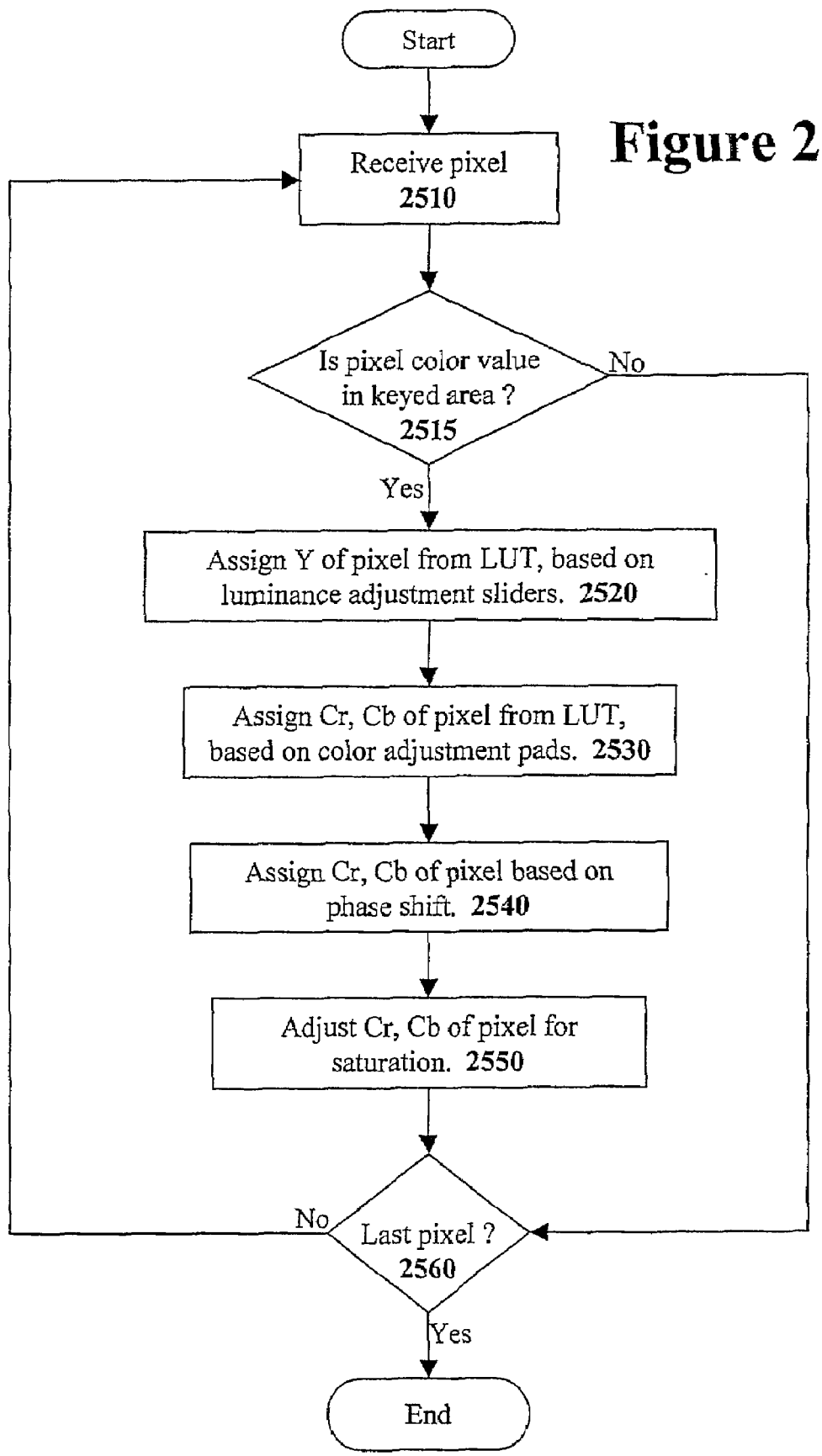
FIG. 25 is a flow diagram illustrating an overall description of the pixel remapping of the inventive color correction over keyed pixels.

FIG. 25 illustrates an overall description of the pixel remapping of the inventive color correction described in FIG. 12 but only over the keyed pixels. As indicated, the differentiating step for keying over a designated area occur at 2515, where an assessment is made as to whether a pixel having color value YCrCb is in a keyed area.

The foregoing has described a method and user interface for performing color correction. It is contemplated that changes and modifications may be made by one of ordinary skill in the art, to the materials and arrangements of elements of the present invention without departing from the scope of the invention.

I claim:

1. A method of analyzing a set of pixels in an image displayed on a graphical display screen, said method comprising:
   determining whether the set of pixels within the image has a set of color component values that individually pass a predetermined threshold value; and
   concurrently displaying (i) an indication and (ii) a symbol, on said graphic image when the set of color component values for the set of pixels in said image individually pass the predetermined threshold value, wherein displaying the indication comprises highlighting the set of pixels in order to visually specify a portion of the image where the set of color component values of the set of pixels have passed the predetermined threshold value.

2. The method of claim 1, wherein the set of color component values is a set of luminance values.

3. The method of claim 1, wherein the set of color component values is a set of chrominance values.

4. The method of claim 1, wherein highlighting the set of pixels comprises zebra striking the set of pixels.

5. The method of claim 1, wherein displaying the symbol comprises displaying a symbol that indicates the image is not in compliance for broadcasting.

6. The method of claim 1 further comprising determining whether another set of pixels within the image has another set of color component values that individually pass another predetermined threshold value, wherein the determination of the set of pixels and the determination of another set of pixels are performed concurrently.

7. A computer readable medium storing a computer program that is executable by at least one processor, the computer program for analyzing a set of pixels in an image displayed on a graphical display screen, the computer program comprising sets of instructions for:
    determining whether a set of pixels within an image has a set of color component values that individually pass a predetermined threshold value; and
    concurrently displaying (i) an indication and (ii) a symbol, on said image when the set of color component values for the set of pixels in said image individually pass the predetermined threshold value, wherein displaying the indication comprises highlighting the set of pixels in order to visually specify a portion of the image where the set of color component values of the set of pixels have passed the predetermined threshold value.

8. The computer readable medium of claim 7, wherein the set of color component values is a set of luminance values.

9. The computer readable medium of claim 7, wherein the set of color component values is a set of chrominance values.

10. The computer readable medium of claim 7, wherein the set of instructions for highlighting the set of pixels comprises a set of instructions for zebra striking the set of pixels.

11. The computer readable medium of claim 7, wherein the set of instructions for displaying the symbol comprises a set of instructions for displaying a symbol that indicates the image is not in compliance for broadcasting.

12. A computer readable medium storing a computer program for execution by at least one processor, said computer program comprising a set of instructions for presenting a graphical user interface (GUI) for display on a display screen, the GUI comprising:
    a display area for presenting an image comprising a plurality of pixels;
    a graphical indication for indicating that a set of pixels of the plurality of pixels has a set of color component values that individually pass a predetermined threshold value, wherein the graphical indication is defined by highlighting the set of pixels in order to visually specify a portion of the image where the set of color component values of the set of pixels have passed the predetermined threshold value; and
    a symbol for indicating that the set of pixels has the set of color component values that individually pass the predetermined threshold value.

13. The computer readable medium of claim 12, wherein highlighting the set of pixels comprises zebra striking the set of pixels.

14. The computer readable medium of claim 12, wherein the set of color component values is a set of luminance values.

15. The computer readable medium of claim 12, wherein the set of color component values is a set of chrominance values.

16. A computer readable medium storing a computer program which, when executed by at least one processor, analyzes a set of pixels in an image, the computer program comprising sets of instructions for:
    displaying the image on a display screen;
    comparing a luminance value for each of the set of pixels in said image with a predetermined threshold value, wherein the predetermined threshold value comprises only a predetermined luminance value; and
    displaying a luminance alert on said displayed image when at least one luminance value for at least one pixel in the set of pixels passes said predetermined threshold value.

17. The computer readable medium of claim 16, wherein the predetermined threshold value is a first threshold value near a second threshold value, wherein passing the first threshold value is indicative of being near the second threshold value.

18. The computer readable medium of claim 17, wherein the predetermined luminance value is a first predetermined luminance value, the computer program further comprising sets of instructions for:
    comparing the luminance value for each of the set of pixels in said image with the second threshold value, wherein the second threshold value comprises only a second predetermined luminance value; and
    displaying another luminance alert on said displayed image when at least one luminance value for at least one pixel in the set of pixels passes said second threshold value.

19. A computer readable medium storing a computer program which, when executed by at least one processor, analyzes a set of pixels in an image, the computer program comprising sets of instructions for:
    displaying the image on a display screen;
    comparing a saturation value for each pixel in the set of pixels in said image with a predetermined threshold value, wherein the predetermined threshold value comprises only a predetermined saturation value; and
    displaying a saturation alert on said displayed image when at least one saturation value of at least one pixel in the set of pixels passes said predetermined threshold value.

20. The computer readable medium of claim 19, wherein the predetermined threshold value is a first threshold value near a second threshold value, wherein passing the first threshold value is indicative of being near the second threshold value.

21. The computer readable medium of claim 20, wherein the predetermined saturation value is a first predetermined saturation value, the computer program further comprising sets of instructions for:
    comparing the saturation value for each pixel in the set of pixels in said image with the second threshold value, wherein the second threshold value comprises only a predetermined second saturation value; and
    displaying another saturation alert on said displayed image when at least one saturation value of at least one pixel in the set of pixels passes said second threshold value.

* * * * *

UNITED STATES PATENT AND TRADEMARK OFFICE
CERTIFICATE OF CORRECTION

| | | |
|---|---|---|
| PATENT NO. | : 7,907,776 B2 | Page 1 of 1 |
| APPLICATION NO. | : 12/205836 | |
| DATED | : March 15, 2011 | |
| INVENTOR(S) | : Randy Ubillos | |

It is certified that error appears in the above-identified patent and that said Letters Patent is hereby corrected as shown below:

On page 2, under "Other Publications", in column 2, line 5, delete "Pulished" and insert -- Published --, therefor.

On page 2, under "Other Publications", in column 2, line 24, delete "Restricition" and insert -- Restriction --, therefor.

In column 14, line 28, delete "they axis;" and insert -- the y axis; --, therefor.

In column 16, line 34, delete "$U_W=m_W*sin\alpha_W V_W=m_W*sin\alpha_W$" and insert -- $U_W=m_W*sin\alpha_W V_W=m_W*cos\alpha_W$ --, therefor.

In column 16, line 36, delete "$U_M=m_M*sin\alpha_M V_M=m_M*sin\alpha_M$" and insert -- $U_M=m_M*sin\alpha_M V_M=m_M*cos\alpha_M$ --, therefor.

In column 16, line 38, delete "$U_B=m_B*sin\alpha_B V_B=m_B*sin\alpha_B$" and insert -- $U_B=m_B*sin\alpha_B V_B=m_B*cos\alpha_B$ --, therefor.

In column 16, line 44, delete "(CBLUT)" and insert -- (CbLUT) --, therefor.

In column 17, line 6, delete "18910," and insert -- 1890, --, therefor.

In column 18, line 5, delete "the cylindrical" and insert -- cylindrical --, therefor.

In column 18, line 35, delete "connected" and insert -- corrected --, therefor.

In column 18, line 61, in Claim 1, delete "graphic image" and insert -- image --, therefor.

Signed and Sealed this
Twentieth Day of December, 2011

David J. Kappos
*Director of the United States Patent and Trademark Office*